US008438643B2

(12) United States Patent
Wiemer et al.

(10) Patent No.: US 8,438,643 B2
(45) Date of Patent: May 7, 2013

(54) INFORMATION SYSTEM SERVICE-LEVEL SECURITY RISK ANALYSIS

(75) Inventors: Douglas Wiemer, Ashton (CA);
Christophe Gustave, Ottawa (CA);
Stanley TaiHai Chow, Ottawa (CA);
Bradley Kenneth McFarlane, Ottawa (CA)

(73) Assignee: Alcatel Lucent, Paris (FR)

( * ) Notice: Subject to any disclaimer, the term of this patent is extended or adjusted under 35 U.S.C. 154(b) by 1333 days.

(21) Appl. No.: 11/366,101

(22) Filed: Mar. 2, 2006

(65) Prior Publication Data
US 2007/0067847 A1 Mar. 22, 2007

Related U.S. Application Data

(63) Continuation-in-part of application No. 11/232,004, filed on Sep. 22, 2005.

(51) Int. Cl.
*G06F 21/00* (2006.01)
(52) U.S. Cl.
USPC .................. 726/25; 726/5; 726/22; 380/250; 713/182; 709/223; 709/224; 455/521; 705/38
(58) Field of Classification Search .................... 726/25, 726/24
See application file for complete search history.

(56) References Cited

U.S. PATENT DOCUMENTS

| 5,751,965 | A | 5/1998 | Mayo et al. |
| 5,850,516 | A | 12/1998 | Schneier |
| 6,125,453 | A | 9/2000 | Wyss |
| 6,282,546 | B1 | 8/2001 | Gleichauf et al. |
| 6,298,445 | B1 * | 10/2001 | Shostack et al. ................ 726/25 |
| 6,301,668 | B1 | 10/2001 | Gleichauf et al. |
| 6,321,338 | B1 | 11/2001 | Porras et al. |
| 6,535,227 | B1 | 3/2003 | Fox et al. |
| 6,782,421 | B1 * | 8/2004 | Soles et al. ..................... 709/223 |
| 6,883,101 | B1 * | 4/2005 | Fox et al. ........................ 726/25 |

(Continued)

FOREIGN PATENT DOCUMENTS

| WO | WO 01/60024 A2 | 8/2001 |
| WO | WO 02/054325 A2 | 7/2002 |

OTHER PUBLICATIONS

Farahmand et al, Managing Vulnerabilities of Information Systems to Security Incidents, ICEC 2003, ACM 1-58113, p. 248-354.*

(Continued)

*Primary Examiner* — Morshed Mehedi
(74) *Attorney, Agent, or Firm* — Eckert Seamans Cherin & Mellott, LLC

(57) ABSTRACT

Information system service-level security risk analysis systems, methods, and Graphical User Interfaces are disclosed. Assets of an information system that have relationships with a service provided by the information system are identified, and at least one security risk to the service is determined by analyzing security vulnerabilities associated with the identified assets. A consolidated representation of the service is provided, and includes an indication of the determined security risk(s) and an indication of a relationship between the service and at least one of the identified assets. The security risk indication may include indications of multiple security parameters. Security risks may be represented differently depending on whether they arise from a security vulnerability of an asset that has a relationship with the service or a security vulnerability of an asset that has a relationship with the service only through a relationship with an asset that has a relationship with the service.

16 Claims, 12 Drawing Sheets

U.S. PATENT DOCUMENTS

| | | | |
|---|---|---|---|
| 6,895,383 B2 | 5/2005 | Heinrich | |
| 6,907,531 B1 | 6/2005 | Dodd et al. | |
| 6,990,591 B1* | 1/2006 | Pearson | 726/22 |
| 7,003,561 B1* | 2/2006 | Magdych et al. | 709/223 |
| 7,152,105 B2 | 12/2006 | McClure et al. | |
| 7,240,213 B1* | 7/2007 | Ritter | 713/182 |
| 7,243,148 B2 | 7/2007 | Keir et al. | |
| 7,257,630 B2 | 8/2007 | Cole et al. | |
| 7,299,489 B1* | 11/2007 | Branigan et al. | 726/2 |
| 7,340,776 B2 | 3/2008 | Zobel et al. | |
| 7,359,962 B2 | 4/2008 | Willebeek-LeMair et al. | |
| 7,372,809 B2* | 5/2008 | Chen et al. | 370/229 |
| 7,376,969 B1 | 5/2008 | Njemanze et al. | |
| 7,451,488 B2 | 11/2008 | Cooper et al. | |
| 7,523,504 B2 | 4/2009 | Shah | |
| 8,201,257 B1* | 6/2012 | Andres et al. | 726/25 |
| 2002/0078381 A1 | 6/2002 | Farley et al. | |
| 2002/0104014 A1* | 8/2002 | Zobel et al. | 713/200 |
| 2002/0138416 A1 | 9/2002 | Lovejoy et al. | |
| 2002/0199122 A1 | 12/2002 | Davis et al. | |
| 2003/0046582 A1 | 3/2003 | Black et al. | |
| 2003/0097588 A1 | 5/2003 | Fischman et al. | |
| 2003/0126466 A1 | 7/2003 | Park et al. | |
| 2003/0126472 A1 | 7/2003 | Banzhof | |
| 2003/0154269 A1* | 8/2003 | Nyanchama et al. | 709/223 |
| 2003/0154393 A1* | 8/2003 | Young | 713/200 |
| 2003/0154404 A1 | 8/2003 | Beadles et al. | |
| 2003/0212909 A1* | 11/2003 | Chandrashekhar et al. | 713/201 |
| 2003/0233438 A1* | 12/2003 | Hutchinson et al. | 709/223 |
| 2004/0010571 A1 | 1/2004 | Hutchinson et al. | |
| 2004/0093513 A1 | 5/2004 | Cantrell et al. | |
| 2004/0102922 A1 | 5/2004 | Tracy et al. | |
| 2004/0143753 A1 | 7/2004 | Hernacki et al. | |
| 2004/0168086 A1 | 8/2004 | Young et al. | |
| 2004/0221176 A1 | 11/2004 | Cole | |
| 2005/0010819 A1 | 1/2005 | Williams et al. | |
| 2005/0010821 A1 | 1/2005 | Cooper et al. | |
| 2005/0015672 A1 | 1/2005 | Yamada | |
| 2005/0022021 A1 | 1/2005 | Bardsley et al. | |
| 2005/0039046 A1 | 2/2005 | Bardsley et al. | |
| 2005/0080720 A1* | 4/2005 | Betz et al. | 705/38 |
| 2005/0091542 A1 | 4/2005 | Banzhof | |
| 2005/0114186 A1* | 5/2005 | Heinrich | 705/7 |
| 2005/0160480 A1* | 7/2005 | Birt et al. | 726/25 |
| 2005/0177746 A1* | 8/2005 | Bunn et al. | 713/201 |
| 2005/0193430 A1 | 9/2005 | Cohen et al. | |
| 2005/0257269 A1 | 11/2005 | Chari et al. | |
| 2006/0005245 A1* | 1/2006 | Durham et al. | 726/25 |
| 2006/0010497 A1* | 1/2006 | O'Brien et al. | 726/26 |
| 2006/0021044 A1* | 1/2006 | Cook | 726/25 |
| 2006/0101519 A1 | 5/2006 | Lasswell et al. | |
| 2006/0136327 A1* | 6/2006 | You | 705/38 |
| 2006/0156407 A1 | 7/2006 | Cummins | |
| 2006/0191012 A1* | 8/2006 | Banzhof et al. | 726/25 |
| 2007/0016955 A1 | 1/2007 | Goldberg et al. | |
| 2007/0067847 A1 | 3/2007 | Wiemer et al. | |
| 2007/0113265 A2 | 5/2007 | Oliphant | |
| 2009/0076969 A1 | 3/2009 | Sparks | |

OTHER PUBLICATIONS

Nadalin et al., "Business-driven application security: From modeling to managing secure applications", IBM Systems Journal Date of Publication: 2005, vol. 44, Issue: 4, pp. 847-867.*

Stonebumer, G. et al., "Risk Management Guide for Information Technology Systems", NIST National Institute of Standards and Technology, XP007914492, Special Publication 800-30, Jul. 2002, 55 pp.

Sufatrio, et al., "A Machine-Oriented Integrated Vulnerability Database for Automated Vulnerability Detection and Processing", 2004 LISA XVIII—Nov. 14-19, 2004, pp. 47-57.

US Final Office Action dated Feb. 3, 2011 for U.S. Appl. No. 11/366,100 (31 pages).

US Non-Final Office Action dated Aug. 25, 2010 for U.S. Appl. No. 11/366,100 (33 pages).

US Final Office Action dated Apr. 12, 2010 for U.S. Appl. No. 11/366,100 (43 pages).

US Non-Final Office Action dated Dec. 7, 2009 for U.S. Appl. No. 11/366,100 (31 pages).

US Non-Final Office Action dated May 14, 2009 for U.S. Appl. No. 11/366,100 (23 pages).

US Final Office Action dated Nov. 6, 2009 for U.S. Appl. No. 11/366,319 (29 pages).

US Non-Final Office Action dated Jun. 17, 2009 for U.S. Appl. No. 11/366,319 (26 pages).

US Non-Final Office Action dated Apr. 23, 2010 for U.S. Appl. No. 11/232,004 (21 pages).

US Non-Final Office Action dated Nov. 27, 2009 for U.S. Appl. No. 11/232,004 (8 pages).

US Final Office Action dated May 15, 2009 for U.S. Appl. No. 11/232,004 (25 pages).

US Non-Final Office Action dated Dec. 9, 2008 for U.S. Appl. No. 11/232,004 (22 pages).

Decision to refuse a European Patent Application (Form 2007) dated Mar. 3, 2011 for European Patent Application No. 06 300 970.8 (10 pages).

Summons to attend oral proceedings pursuant to Rule 115(1) EPC dated Sep. 9, 2010 for European Patent Application No. 06 300 970.8 (7 pages).

Communication pursuant to Article 94(3) EPC dated Feb. 13, 2009 for European Patent Application No. 06 300 970.8 (1 page).

Extended European Search Report dated Jun. 4, 2008 for European Patent Application No. 06 300 970.8 (18 pages).

Partial European Search Report dated Nov. 12, 2007 for European Patent Application No. 06 300 970.8 (5 pages).

Communication pursuant to Article 94(3) EPC dated Jan. 20, 2011 for European Patent Application No. 06 300 978.1 (10 pages).

Summons to attend oral proceedings pursuant to Rule 115(1) EPC dated Sep. 9, 2010 for European Patent Application No. 06 300 978.1 (6 pages).

Communication pursuant to Article 94(3) EPC dated Jul. 31, 2008 for European Patent Application No. 06 300 978.1 (1 page).

Extended European Search Report dated Dec. 3, 2007 for European Patent Application No. 06 300 978.1 (8 pages).

Summons to attend oral proceedings pursuant to Rule 115(1) EPC dated Sep. 9, 2010 for European Patent Application No. 06 300 971.6 (5 pages).

Communication pursuant to Article 94(3) EPC dated Nov. 20, 2008 for European Patent Application No. 06 300 971.6 (1 page).

Extended European Search Report dated Mar. 26, 2008 for European Patent Application No. 06 300 971.6 (12 pages).

Partial European Search Report dated Dec. 6, 2007 for European Patent Application No. 06 300 971.6 (4 pages).

Extended European Search Report dated Jan. 12, 2011 for European Divisional Patent Application No. 10 183 806.8 (4 pages).

Decision of Rejection dated Feb. 5, 2010 for Chinese Patent Application No. 200610168913.X with English Translation (10 pages).

Notification and First Office Action dated Jul. 3, 2009 for Chinese Patent Application No. 200610168913.X with English Translation (10 pages).

Notification and First Office Action dated Aug. 3, 2010 for Chinese Patent Application No. 200610144429.3 with English Translation (12 pages).

Notification and second Office Action dated Feb. 5, 2010 for Chinese Patent Application No. 200610144762.4 with English Translation (9 pages).

Notification and First Office Action dated Jun. 5, 2009 for Chinese Patent Application No. 200610144762.4 with English Translation (23 pages).

USPTO, Non-Final Office Action for U.S. Appl. No. 11/366,319, Jan. 25, 2012, 18 pages USPTO, Non-Final Office Action for U.S. Appl. No. 11/132,118, Jan. 22, 2009, 10 pages.

USPTO, Final Office Action for U.S. Appl. No. 11/132,118, Aug. 20, 2009, 10 pages.

USPTO, Non-Final Office Action for U.S. Appl. No. 11/131,598, Mar. 13, 2009, 12 pages.

USPTO, Final Office Action for U.S. Appl. No. 11/131,598, Aug. 28, 2009, 13 pages.

Apostolakis, G.E. et al., "A Screening Methodology for the Identification and Ranking of Infrastructure Vulnerabilities Due to Terrorism", XP-002457051, Risk Analysis, vol. 25, No. 2, 2005, pp. 361-376.

Schiffman, M., "The Common Vulnerability Scoring System", XP-002479898, The RSA Conference, Feb. 2005, 41 pp.

International Standard, "Information technology—Security techniques—Evaluation criteria for IT security—Part 1: Introduction and general model," ISO/IEC 15408-1:1999(E), First Edition Dec. 1, 1999, 62 pp.

Wu, William et al., Integrated Vulnerability Management System for Enterprise Networks, E-Technology, E-Commerce and E-Service, 2005. EEE'05. Proceedings. The 2005 IEEE International Conference on Hong Kong, China March 29-01, 2005, Piscataway, NJ, USA, IEEE, Mar. 29, 2005, pp. 698-703.

Young-Hwan Bang, Yoon-Jung Jung, Injung Kim, Namhoon Lee, Gang-Soo Lee: "The Design and Development for Risk Analysis Automatic Tool" Online, [Online] 2004, pp. 491-499, XP002400108. Retrieved from the internet: URL:http://springerlink.metapress.com/content/1a5017n9txrumuur/fulltext.pdf> whole document.

Jansen, A. et al., "Adopting Internet-Centric Technologies in Network Management: The Internet has spawned a number of new technologies which are increasingly being used to enhance network and service management" ALCATEL Telecommunications Review, ALCATEL, Paris CEDEX, FR, Jul. 2003 XP007005936 ISSN: 1267-7167, 10 pp.

Baybutt, Cyber Security Vulnerability Analysis: An Asset-based approach, Dec. 2003, Process Safety Progress, vol. 22, No. 4. pp. 220-228.

Polepeddi, S., "Software Vulnerability Taxonomy Consolidation", XP-002457428, UCRL-TH-208822, Jan. 4, 2005, 41 pp.

Böhme, R., "A Comparison of Market Approaches to Software Vulnerability Disclosure", Emerging Trends in Information and Communication Security Lecture Notes in Computer Science; LNCS, Springer-Verlag, BE, vol. 3995, 2006, pp. 298-311.

Ferson, S., "Fuzzy arithmetic in risk analysis". Aug. 2003. Available at http://web.archive.org/web/20030822232721/www.ramas.com/fuzzygood.ppt/www.ramas.com/fuzzygood.ppt. Downloaded Sep. 17, 2009, 30 pp.

Stamatelatos, G., "New Thrust for Probabilistic Risk Assessment (PRA) at NASA; Risk Analysis for Aerospace Systems II: Mission Success Starts with Safety". Oct. 28, 2002. Available at http://www.sra.org/docs/Stamatelatos.pdf. Downloaded Sep. 17, 2009, 45 pp.

Hayden, B. et al., "On the Generation of Short Paths and Minimal Cutsets of the Hierarchical Web Graph". Jul. 21, 2005. Available at http://dimax.rutgers.edu/~ehayden/REU%20all1.pdf. Downloaded Sep. 17, 2009, 8 pp.

Fleming, R., "Vulnerability Assessment Using a Fuzzy Logic Based Method". Dec. 7, 1993. Available at http://handle.dtic.mil/100.2/ADA274075. Downloaded Sep. 17, 2009, 101 pp.

Liang, W., Efficient Enumeration of All Minimal Separators in a Graph, Theoretical Computer Science, 180: 169-180, 1997.

Karas, W., C++AVL Tree Template Version 1.3, http://www.geocities.com/wkaras/gen_cpp/avl_tree.html?200522, Aug. 22, 2005.

Maggio, "Space Shuttle Probabilistic Risk Assessment: Methodology & Application", 1996 Proceedings Annual, Reliability and Maintainability Symposium, pp. 121-132, Jan. 25, 1996.

Hong et al., "Efficient enumeration of all minimal separators in a graph", Theoretical Computer Science, Jun. 10, 1997, pp. 169-180, vol. 180, No. 1-2, Australia.

Kloks et al., "Finding all minimal separators in a graph", Proceedings of 11$^{th}$ Symposium of Theoretical Aspects of Computer Science, Feb. 1994, pp. 759-768, Berlin.

Littlewood, B., Broclehurst, S., Fenton, N., Mellor, P., Page, S., Wright, D., Dobson, J., McDermid, J., and Gollman, D. 1993. Towards Operational Measures of Computer Security. J. Comput. Sec. 2, 2. Available at http://www.csr.city.ac.uk/people/bev.littlewood/bl_public papers/Measurement_of_security/Quantitative_security.pdf. downloaded Sep. 17, 2009, 24 pp.

"Common Criteria International Standard ISO/IEC 15408:1999". Aug 1999. Available at http://www.niap-ccevs.org/cc-scheme/cc_docs/cc_v21 part1.pdf. Downloaded Sep. 17, 2009, 61 pp.

* cited by examiner

INFORMATION SYSTEM SERVICE-LEVEL SECURITY RISK ANALYSIS

CROSS-REFERENCE TO RELATED APPLICATION

The present application is related to U.S. patent application Ser. No. 11/131,598, entitled "SECURITY RISK ANALYSIS SYSTEMS AND METHODS", and filed on May 18, 2005, to U.S. patent application Ser. No. 11/132,118, entitled "COMMUNICATION NETWORK SECURITY RISK EXPOSURE MANAGEMENT SYSTEMS AND METHODS", and filed on May 18, 2005, to U.S. patent application Ser. No. 11/366,100, entitled "SYSTEMS AND METHODS OF ASSOCIATING SECURITY VULNERABILITIES AND ASSETS", and filed of even date herewith, and to U.S. patent application Ser. No. 11/366,319, entitled "SECURITY VULNERABILITY INFORMATION AGGREGATION", and filed of even date herewith.

This application also claims the benefit of U.S. patent application Ser. No. 11/232,004, entitled "APPLICATION OF CUT-SETS TO NETWORK INTERDEPENDENCY SECURITY RISK ASSESSMENT", and filed on Sep. 22, 2005, and is a continuation-in-part.

The entire contents of each of the above-identified applications are incorporated into the present application by reference.

FIELD OF THE INVENTION

This invention relates generally to security risk analysis, and in particular to analysis of security risks at a service level in an information system.

BACKGROUND

In complex systems such as telecommunications and Information Technology (IT) infrastructures, the potential impacts of security vulnerabilities, even if discovered and disclosed, tend to be difficult to assess in a timely fashion. This is primarily due to the number and nature of these vulnerabilities, as well as the number of assets in such systems. Some assets may also have embedded software layers and other dependencies, which further complicates security assessments. These complications may be further compounded when considering services provided in an information system, since services may involve many different assets and dependencies with and between those assets.

The capacity to understand and make informed decisions soon after a vulnerability is disclosed is one key aspect of proactive security. Such capacity allows network operators, for example, to understand the security state, i.e., the risk to a network infrastructure, at any given time and to assign a priority action list for risk mitigation. Identification of commercial risks associated with relying on data stored and transmitted on network segments during a period of elevated security risk may also be of use in performing a comprehensive security assessment.

In common Network Management Systems (NMSs), a view of a managed communication network is limited to physical topology of interconnected systems. This view does not provide the level of information required to properly assess the status of aggregated views at higher layers suitable for operational decisions based on service, business, or functional priorities.

Several currently available management tools provide some sort of service-level view. One tool has the ability to model a "customer" and create a relationship between the customer and a network based on a Service Level Agreement (SLA) profile. The model allows the presentation of services and customers, their relationship to network objects and the relationships between network objects in the form of a graphical asset map. Another tool allows service-level characteristics to be displayed in a basic color-coded chart that represents a list of services and corresponding statuses in respect of performance, applications, systems, network, and security. Tools providing support for display of a service as a hierarchical graph of service and related asset icons, grouped by customer, are also known.

These and other existing tools, however, present limited or incomplete views of service-level status or security risks. For example, currently available tools do not provide a mechanism to present complex relationships between services, assets, and the physical topology of an information system in one consolidated representation. Some tools use separate views to present customer and service relationships, asset relationships, and physical topology, whereas others do not present service relationships at all. This limits the tools in that a user is not able to quickly relate a service security risk state to its related assets.

A further shortcoming of existing tools relates to the level of information provided. Service status in a service-level view may be limited to a color-coded icon or list item that represents only one attribute or aggregated attribute, without presenting in the same view lower-level details regarding underlying assets that contribute to service-level security, for instance. Existing tools also do not differentiate between security metrics, which may lead to difficulties in identifying exactly what an indicator is intended to indicate. A green icon may be intended to indicate that no alarms have been raised by a firewall, but may be interpreted incorrectly by an operator as indicating that a service is secure for confidentiality. Other security vulnerabilities may exist, but might not be clearly represented.

Current tools are further limited in terms of security monitoring, and may report only the results and alerts received from firewall, Intrusion Detection Systems (IDSs) and other security appliances, for example. Such tools have no mechanism to collect or present information related to the analysis of assets and security vulnerabilities. Other tools that may support vulnerability analysis do not account for asset interdependence, such that a failure in a database used by a software application that is involved in providing a service will not appear as a failure in the dependent application. Therefore, critical aspects of information may be lost as information is aggregated up to the service level.

Thus, there remains a need for improved techniques for service-level security risk analysis.

SUMMARY OF THE INVENTION

Embodiments of the invention enable complex information system asset relationships to be represented along with security risks to services provided in the information system, to generate a service-level view of interconnected assets. Services, and also assets in some embodiments, may be represented using icons that can display attributes such as total security risk impact to enable prioritization of operational response based on service priorities.

Service-level views may allow representation of service risks calculated using any of various risk analysis functions. Other service level attributes associated with an SLA, for example, might also be represented in a service-level view.

According to an aspect of the invention, there is provided an apparatus that includes a risk analyzer configured to identify one or more assets of an information system that have respective relationships with a service provided by the information system, and to determine one or more security risks to the service by analyzing security vulnerabilities associated with the identified assets, and an interface operatively coupled to the risk analyzer and configured to provide a consolidated representation of the service, the consolidated representation comprising an indication of the one or more determined security risks and an indication of at least one of the respective relationships between the service and the one or more identified assets.

Either or both of the risk analyzer and the interface may be implemented in software for execution by a processing element.

The one or more identified assets may include one or more other services that have respective relationships with the service.

The one or more identified assets may include an asset that has a relationship with the service only through a relationship with an asset that has a relationship with the service.

In some embodiments, the risk analyzer is configured to determine the one or more security risks to the service by aggregating security risks to multiple contributing assets of the one or more identified assets. The risk analyzer may determine an aggregated security risk to the service by performing one of: selecting as the aggregated security risk a maximum of the security risks to the multiple contributing assets, selecting as the aggregated security risk a minimum of the security risks to the multiple contributing assets, and determining the aggregated security risk based on a combination of maximum and minimum security risks to the multiple contributing assets.

The risk analyzer may be configured to determine an aggregated asset security risk to an asset of the one or more assets by aggregating security risks arising from multiple security vulnerabilities associated with the asset. In this case aggregating may involve performing one of: determining the aggregated asset security risk based on a maximum of the security risks arising from the multiple security vulnerabilities, determining the aggregated asset security risk based on a minimum of the security risks arising from the multiple security vulnerabilities, and determining the aggregated asset security risk based on a combination of maximum and minimum security risks arising from the multiple security vulnerabilities.

The indication of the one or more determined security risks may include an indication of at least one security parameter.

The consolidated representation of the service may also include respective icons representing the service and at least one of the one or more identified assets. In this case, the indication of the at least one of the respective relationships between the service and the one or more identified assets may include respective links between the respective icons representing the service and the at least one of the one or more identified assets.

In some embodiments, the indication of the one or more determined security risks includes different representations of a security risk arising from a security vulnerability associated with an asset that has a relationship with the service and a security risk arising from a security vulnerability associated with an asset that has a relationship with the service only through a relationship with an asset that has a relationship with the service.

Where security risks to multiple contributing assets are aggregated, the risk analyzer may maintain a record of at least one of the multiple contributing assets.

A method is also provided, and involves identifying one or more assets of an information system that have respective relationships with a service provided by the information system, analyzing security vulnerabilities associated with the one or more identified assets to determine one or more security risks to the service, and providing, in a consolidated representation of the service, an indication of the one or more determined security risks and an indication of at least one of the respective relationships between the service and the one or more identified assets.

The operation of identifying may involve identifying an asset that has a relationship with the service only through a relationship with an asset that has a relationship with the service.

The indication of the one or more determined security risks may include an indication of at least one security parameter.

In some embodiments, the indication of the one or more determined security risks includes different representations of a security risk arising from a security vulnerability associated with an asset that has a relationship with the service and a security risk arising from a security vulnerability associated with an asset that has a relationship with the service only through a relationship with an asset that has a relationship with the service.

The operation of determining the one or more security risks may involve determining one or more aggregated security risks by aggregating security risks to multiple contributing assets of the identified assets, and maintaining a record of at least one contributing asset for each of the one or more aggregated security risks.

Security risks to multiple contributing assets may be aggregated to determine an aggregated security risk of the one or more security risks by performing one of: selecting as the aggregated security risk a maximum of the security risks to the multiple contributing assets, selecting as the aggregated security risk a minimum of the security risks to the multiple contributing assets, and determining the aggregated security risk based on a combination of maximum and minimum security risks to the multiple contributing assets.

An aggregated asset security risk to an asset of the one or more assets may also be determined in some embodiments by aggregating security risks arising from multiple security vulnerabilities associated with the asset. This may involve performing one of: determining the aggregated asset security risk based on a maximum of the security risks arising from the multiple security vulnerabilities, determining the aggregated asset security risk based on a minimum of the security risks arising from the multiple security vulnerabilities, and determining the aggregated asset security risk based on a combination of maximum and minimum security risks arising from the multiple security vulnerabilities.

A method may be embodied, for example, in instructions stored on a machine-readable medium.

A further aspect of the invention provides a Graphical User Interface (GUI). The GUI includes a consolidated representation of a service provided by an information system, and the consolidated representation includes an indication of one or more security risks to the service, and an indication of at least one of one or more respective relationships between the service and one or more assets of the information system that contribute to the one or more security risks to the service.

The respective relationships may include an asset relationship between an asset, which has a relationship with the service, and another asset of the information system that has a relationship with the service only through the asset relationship.

The indication of the one or more determined security risks may include an indication of at least one security parameter.

In some embodiments, the consolidated representation of the service also includes respective icons representing the service and at least one of the one or more identified assets. In this case, the indication of the at least one of the respective relationships between the service and the one or more identified assets includes respective links between the respective icons representing the service and the at least one of the one or more identified assets.

The indication of the one or more determined security risks may include different representations of a security risk arising from a security vulnerability associated with an asset that has a relationship with the service and a security risk arising from a security vulnerability associated with an asset that has a relationship with the service only through a relationship with an asset that has a relationship with the service.

The one or more security risks may include one or more aggregated security risks determined by aggregating security risks to multiple contributing assets, in which case the indication of the one or more security risks may include a functional graphical element representing an aggregated security risk of the one or more aggregated security risks. The functional graphical element provides access to a record of at least one of the contributing assets for the aggregated security risk.

An icon for display in a GUI includes a representation of an asset of an information system, and respective indications of a plurality of security parameters for a security risk to the asset.

In some embodiments, the asset is a service provided in the information system, the service has respective relationships with one or more assets of the information system, and the respective indications include respective sets of indications of the plurality of security parameters for security risks to the service. The respective sets of indications include a first set of indications of the plurality of security parameters for a security risk to the service arising from one or more security vulnerabilities associated with an asset of the one or more assets, and a second set of indications of the plurality of security parameters for a security risk to the service arising from one or more security vulnerabilities associated with one or more other assets that have respective relationships with the service only through respective relationships with an asset of the one or more assets.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
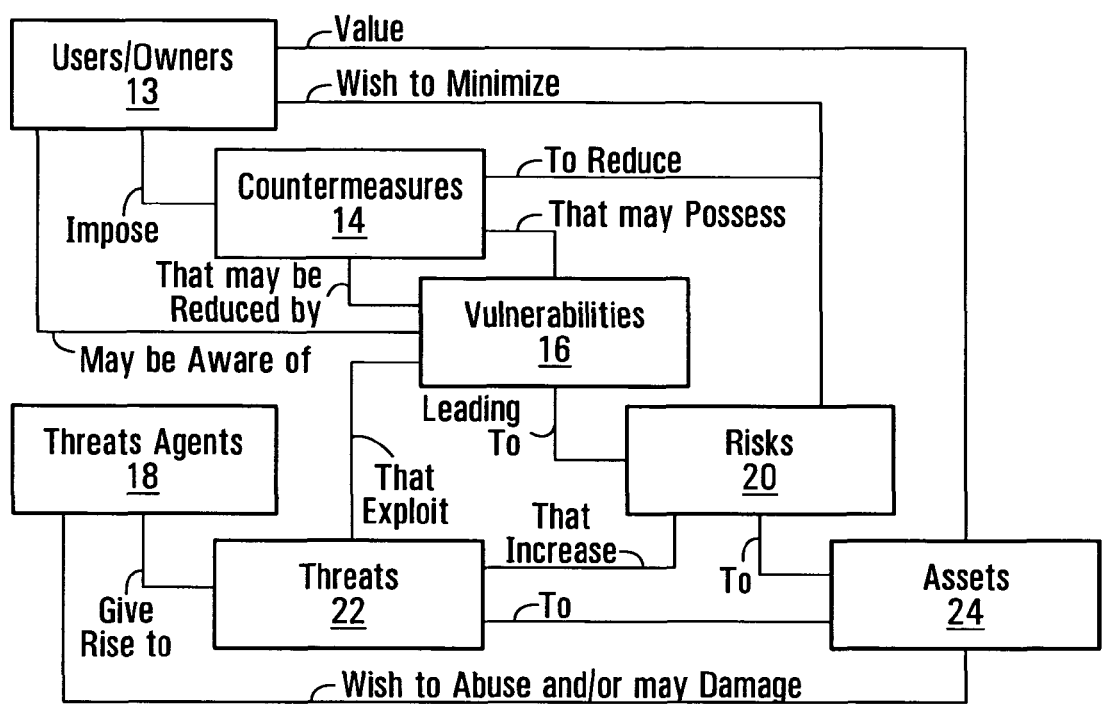
FIG. 1 is a block diagram representation of general security concepts.

As described briefly above, currently available security assessment and management tools do not provide for a complete and comprehensive assessment of security, especially for complex information systems such as communication networks.

For example, four classes of system may be identified as providing partial solutions to security and vulnerability management in a network infrastructure. These classes include network vulnerability scanners, intrusion detection/prevention systems, security event/information systems, and exposure risk management systems.

Of these classes, the exposure risk management systems class includes the most extensive tools. A risk management system might provide, for example, a view of a network, including scanners data and vulnerability data on an element-by-element basis for network elements such as firewalls and routers, servers, and other hosts. Typically, each element is scanned or otherwise assessed, on its own, to determine its vulnerabilities. Visual maps of an enterprise network, business applications, and potential security problems give security personnel an overview of infrastructure security for each individual element and enables drill-down capabilities for more detailed views relating to specific elements.

A form of business risk may be calculated by assessing both the likelihood of an attack and damage potential as measured by business impact variables. Risk factors might be determined at a detailed level, taking into account various attack scenarios and vulnerabilities.

However, currently known tools cannot address the scope of large telecommunications systems and other complex information systems. These tools cannot provide a realistic view for a complex network or take into account different groups of assets, or relationships between assets, in order to model a given service or mission.

In addition, business risk calculations use attack likelihood based on path determination, i.e., determining a chain of vulnerabilities and assets used to complete an attack. In a large and complex information system it is extremely difficult, and thus impractical if not effectively impossible, to determine an attack path for every possible attack and therefore its likelihood.

Reducing risk calculation to a specific attack path in this manner may be more efficient for a particular vulnerability or combination of vulnerabilities, but could lead to misunderstanding of a more complex situation. This simplification could effectively cause an operator or other personnel to not realize that the actual risk is higher than presented, which could have a huge impact on the overall assessment of the security state of an information system or the services provided in that system.

Embodiments of the invention provide a consolidated representation of service-level security risks, which may be determined using risk exposure management techniques. A flexible security model may provide a flexible asset representation model for mission- and/or service-specific assets deployed in a communication network or other information system, as well as physical/logical topology of the network. A fully customizable and flexible risk exposure calculation may also take into account general security methodologies as well an extension scheme which accounts for specific commercial business risk.

FIG. 1 is a block diagram representation of general security concepts that are relevant to the technical field of the present invention. The representation shown in FIG. 1 illustrates an underlying security paradigm and derived concept based on the Common Criteria International Standard ISO/IEC 15408: 1999 for Information Technology Security Evaluation.

FIG. 1 shows users or owners 13, countermeasures 14, vulnerabilities 16, threat agents 18, threats 22, risks 20, and assets 24. Those skilled in the art will be familiar with the general security paradigm represented in FIG. 1, which is therefore described only briefly herein.

Users/owners 13 may include, for example, owners or operators of a communication network, or other stakeholders having an interest in assets 24.

Countermeasures 14 represent actions, such as upgrading an operating system or application software on a computer system asset for instance, which may be taken to reduce vulnerabilities 16. A vulnerability 16 is a condition in an asset's operation which makes it susceptible to an attack, or possibly a failure. A security hole in operating system software is one illustrative example of a vulnerability.

Threat agents 18 are parties wishing to abuse or use assets 24 in a manner not intended by their users/owners 13. A threat 22 is an indication, illustratively a probability, that an asset 24 may be harmed.

Assets 24, in the example of a communication network, are components of the network and may be either physical or logical. Vulnerabilities 16 may exist for each type of asset 24.

As shown in FIG. 1, users/owners 13 value assets, wish to minimize risks 20 to the assets 24, and may be aware of vulnerabilities 16 which lead to risks 20 to assets 24. Vulnerabilities 16 may be reduced by the users/owners 13 by imposing countermeasures 14. Inter-relations between other concepts shown in FIG. 1 will be apparent to those skilled in the art from a review thereof.

Figure 2:
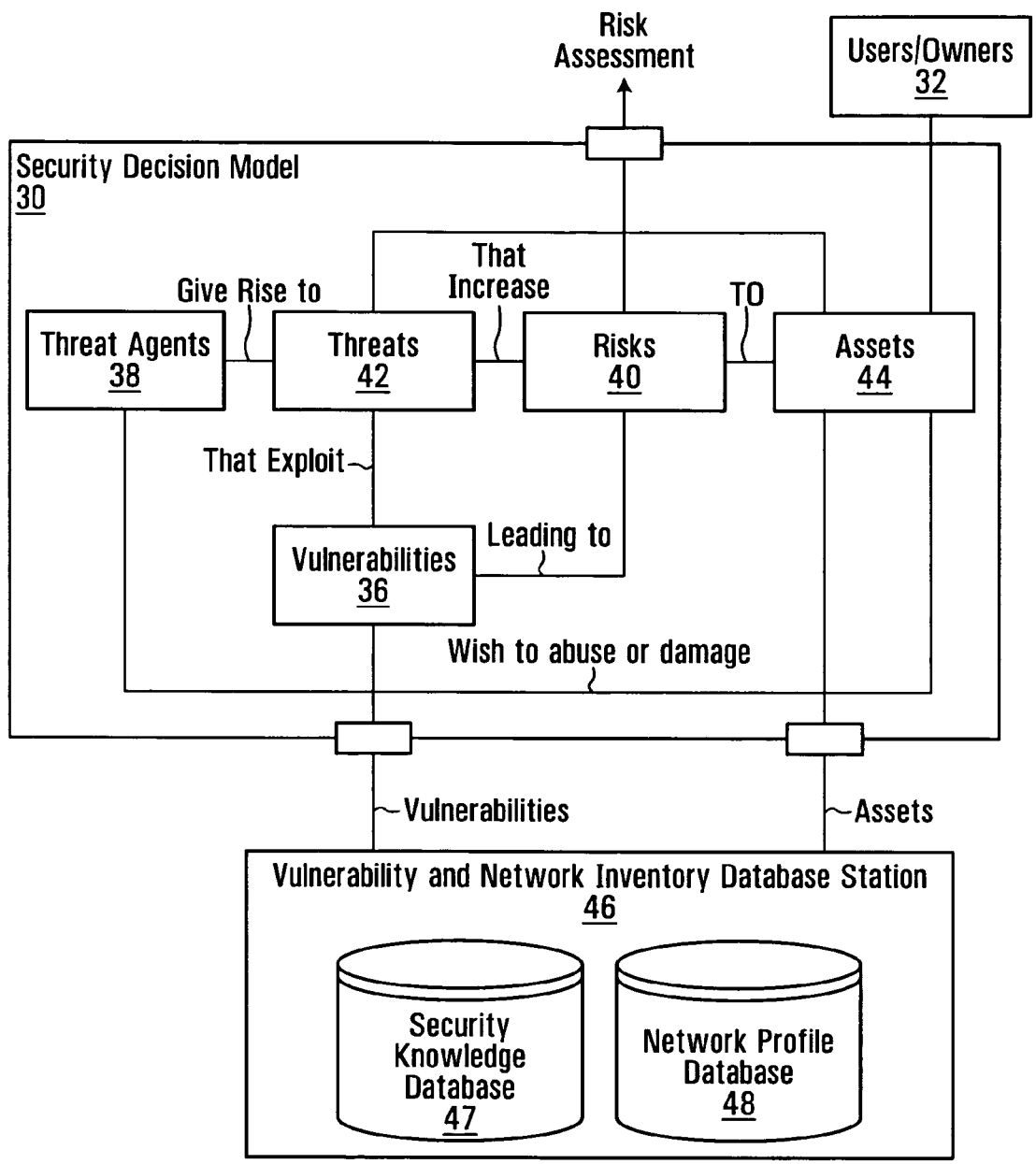
FIG. 2 is a block diagram representation of a security decision model.

An adaptation of the concepts shown in FIG. 1 and how they relate to security risk analysis are represented in FIG. 2, which is a block diagram representation of a security decision model.

The users/owners 32, threat agents 38, threats 42, risks 40, assets 44, and vulnerabilities 36 in FIG. 2 may be substantially the same as similarly labelled components of FIG. 1, but are handled differently than in conventional techniques according to embodiments of the invention.

The vulnerability and network inventory database system 46 includes databases which store either information associated with vulnerabilities and assets or information from which vulnerability and asset information may be derived. In the example shown in FIG. 2, the database system 46 includes a security knowledge database 47 which stores information associated with known vulnerabilities or security information which is converted or otherwise processed to generate vulnerability information. The network profile database 48 stores network inventory information. Information associated with assets in an information system such as a communication network may be obtained from the network profile database 48 or derived from information which is obtained from the network profile database 48.

It should be appreciated that a communication network is one example of an information system to which the techniques disclosed herein may be applied. These techniques may be applied to other types of information system.

Various implementations of the database system 46 will be apparent to those skilled in the art. For example, any of many different types of data storage device, such as disk drives and solid state memory devices, may be used to store the databases 47, 48. According to one particular implementation, the databases 47, 48 are stored at a computer system which also executes software implementing the security decision model 30. It should be appreciated, however, that the database system 46 is intended to more generally represent a system through which vulnerability and asset information, or information from which these can be derived, is accessible. The databases 47, 48 may thus be remote databases which are made accessible to the model 30 through appropriate interfaces and connections. The databases 47, 48 may reside at a server in a Local Area Network (LAN), for example, in which case information is accessible through a network interface and LAN connections.

In operation, the security decision model 30 takes into account assets and vulnerabilities to determine a risk assessment. The risk assessment provides an indication of current network security state to the users/owners 32.

Figure 3:
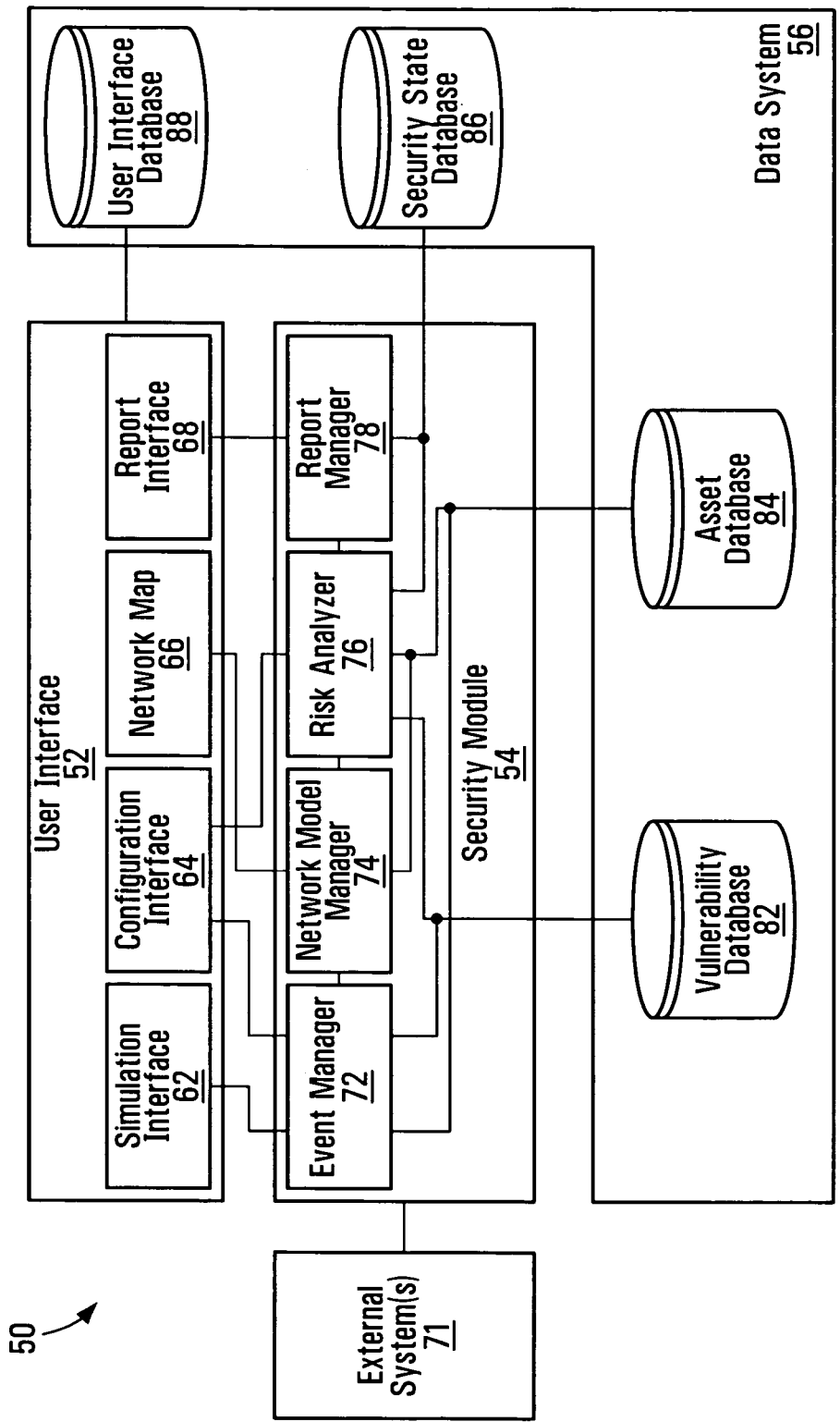
FIG. 3 is a block diagram of a security risk exposure management system.

The security decision model 30 may be implemented as shown in FIG. 3, which is a block diagram of a security risk exposure management system.

The architecture of the system 50 includes three main elements, namely the user interface 52, the security module 54, and the data system 56. In one embodiment, these elements are implemented in a computer system. The user interface 52 might then be provided through a display and input devices such as a keyboard, mouse, and/or a touchscreen, the security module 54 could be implemented primarily in software for storage in a memory of the computer system and execution by a processor, and the data system 56 could include local stores, interfaces to remote stores, or some combination thereof.

It should be appreciated that embodiments of the invention may include further, fewer, or different elements, with different interconnections, than those explicitly shown in FIG. 3. For example, a security risk management system might not include every element shown in FIG. 3. A computer system or other equipment in which the system 50 or another embodiment of the invention is implemented may also include further elements used for other functions. A processor in a computer system would typically execute operating system software in addition to application software implementing security risk management functions for instance. Thus, FIG. 3, as well as the other drawings, are intended solely for illustrative purposes, and not to limit the scope of the invention.

The components of the system 50 may be operatively coupled to each other through physical connections or through logical interconnections where any of the components are implemented using software for execution by one or more processing elements.

It will thus be apparent that the components of the system 50 may be implemented using hardware, software, firmware, or combinations thereof. Those skilled in the art will be familiar with devices that may be used in implementing the system

50, including microprocessors, microcontrollers, Application Specific Integrated Circuits (ASICs), Programmable Logic Devices (PLDs), and/or Field Programmable Gate Arrays (FPGAs), for example.

In view of the many possible implementations of the components shown in FIG. 3, these components are described herein primarily in terms of their function. Based on these functional descriptions, a skilled person would be enabled to implement embodiments of the invention in any of various ways.

The data system 56, however, would generally be provided as data stores in a hardware component, specifically one or more memory devices. Solid state memory devices are common in some types of system, although the system 50 may also or instead include memory devices for use with movable or even removable memory media.

The user interface 52 will also generally be provided at least in part by physical devices. In the particular example embodiment shown in FIG. 3, the user interface 52 includes a simulation interface 62, a configuration interface 64, a network map 66 and a report interface 68. These user interface elements 62, 64, 66, 68 interact with the security module 54 to accept user inputs and/or to provide outputs to users. A display, keyboard, mouse, and touchscreen represent examples of the types of input and output device through which information may be transferred between users and the security module 54. These elements may also have associated software components for execution by a processor to process and transfer input and output information.

The simulation interface 62, the configuration interface 64, the network map 66, and the report interface 68 are operatively coupled to the security module 54. The form of connections through which these elements interact is dependent upon the particular type of equipment in which the system 50 is implemented. Internal bus structures, for example, are often used in computer systems, and thus interactions between the user interface 52 and its components with the security module 54, as well as the data system 56, may be enabled through internal connections, drivers, and interfaces between a processor and various input/output devices. However, other types of connection may be used.

The security module 54 includes an event manager 72 which is operatively coupled to the simulation interface 62, to the configuration interface 64, to one or more external systems 71, and to the data system 56, a network model manager 74 which is operatively coupled to the network map 66, to the event manager 72, and to the data system 56, a risk analyzer 76 which is operatively coupled to the configuration interface 64, to the network model manager 74, and to the data system 56, and a report manager 78 which is operatively coupled to the risk analyzer 76, to the report interface 68, and to the data system 56. These components of the security module 54, like those of the user interface 52, may be implemented in hardware, software for execution by a processor, or some combination thereof.

The data system 56 includes a vulnerability database 82 which is operatively coupled to the event manager 72 and to the risk analyzer 76, an asset database 84 which is operatively coupled to the event manager 72, to the network model manager 74, and to the risk analyzer 76, a security state database 86 which is operatively coupled to the risk analyzer 76 and to the report manager 78, and a user interface database 88 which is operatively coupled to the user interface 52. These databases may be stored in any of various types of storage device, such as solid state memory devices, disk drives, and other types of storage device which use fixed, movable, or possibly removable storage media. The data system 56 may include either data stores or interfaces through which remote data stores are accessible, as noted above in conjunction with FIG. 2. Although shown separately in FIG. 3, multiple databases 82, 84, 86, 88 may be stored in one data store or memory device.

The vulnerability database 82 stores information associated with vulnerabilities, and the asset database 84 stores information associated with assets. These databases represent examples of the databases 47, 48 (FIG. 2). Data structures which may be stored in the databases 82, 84 are described below.

The security state database 86 stores information associated with historical and/or current security risk status of an information system. Information associated with the user interface 52, such as different network views and placement of icons which have been configured by a user, is stored in the user interface database 88.

Initial configuration of the system 50 for operation may involve storing vulnerability information and asset information in the databases 82, 84. Vulnerability and asset information may be manually entered by network operator personnel for example, and/or imported from an existing data store or other source. The databases 82, 84 may be populated through the event manager 72, as described below, or possibly a further interface (not shown) through which the databases 82, 84 are accessible.

The event manager 72 processes incoming events, such as initial network and vulnerability configuration information, introduction of a new vulnerability, or a change in the network topology or configuration. Information may be received by the event manager 72 from the simulation interface 62, the configuration interface 64, or one or more external systems 71 such as a Network Management System (NMS) of a communication network.

A data Application Programming Interface (API) represents another example of a mechanism through which the event manager 72 and/or other components of the system 50 may exchange information with external systems generally shown at 71. Sources of such information as regulatory requirements, network policies, firewall rules, routing tables, encryption keys or other communication security information, and service models, for instance, may use a defined data API to transfer information to the system 50.

Through the simulation interface 62, a user may make trial or temporary changes in a network. This allows users to investigate the effects of changes, countermeasures for instance, before these changes are actually made in the network. A simulation event from the simulation interface 62 is preferably handled in a different manner than changes or updates received from other sources, so that temporary simulation changes do not affect vulnerabilities and assets which reflect actual network conditions. This may be accomplished, for example, by providing separate simulation databases to which temporary changes are applied. Simulation databases could be stored until explicitly deleted or cleared by a user, depending upon the amount of storage space available in the data system 56, or automatically deleted when a user closes or exits the simulation interface 62.

Information received by the event manager 72 from the configuration interface 64 or external system(s) 71 which affects actual vulnerabilities or network assets may be processed and written to the databases 82, 84. The nature of the processing performed by the event manager 72 may be dependent on the type, format, and/or source of the information for instance.

Information entered through the configuration interface 64 may already be formatted according to data structures used to store information in the databases 82, 84 and can be written to the databases without significant processing. In the case of information received from external systems 71, however, processing such as format and/or content conversions may be performed by the event manager 72. For example, e-mail updates including advisories of new vulnerabilities discovered by vendors of software used in a network may be received and processed by the event manager 72 or another component, and used to update the vulnerability database 82. Network equipment or configuration updates received from an NMS might involve an intermediate level of processing, generally less processing than information from other external systems 71 but possibly more processing than information from the internal configuration interface 64.

The event manager 72 may thus receive information associated with vulnerabilities and assets, and update current vulnerabilities and assets, or more specifically information in the databases 82, 84, based on the received information.

The network model manager 74 captures a representation of the network being analyzed from the event manager 72, the asset database 84, or both, to present the network map 66 to a user. Assets and their relationships, as specified in the asset database 84, are used by the network model manager 74 to build a model of the network. Services may be handled in a substantially similar manner, by creating and accessing service information and relationships in the asset database 84, or possibly another database. A service, like an asset, may have relationships with other assets.

Events affecting a current network model may be passed from the event manager 72 to the network model manager 74, or stored in the asset database 84 for access by the network model manager 74. It should thus be appreciated that the network model manager 74 need not necessarily be physically coupled to the event manager 72. In some embodiments, the simulation interface 62 and the configuration interface 64 may be operatively coupled to the network model manager 74 to apply changes to a model.

The risk analyzer 76 performs risk analysis and calculations. In accordance with an aspect of the invention, the risk analyzer 76 determines vulnerabilities affecting assets of a communication network, and determines risks to services provided in the communication network by analyzing the vulnerabilities and assets. Information associated with vulnerabilities and services/assets is stored in the databases 82, 84 as noted above, and accessed by the risk analyzer 76.

Assets may include either or both of physical assets, illustratively equipment in the communication network, and logical assets such as software running on equipment in the communication network, information stored by equipment in the communication network, and services.

Indications of risks determined by the risk analyzer 76 are provided to the network model manager 74, so that a consolidated representation of a service, including an indication of the determined risks and relationships between the service and other assets, can be provided to a user through the user interface 52 in the form of the network map 66. The network map 66 may thus include both a representation of network topology and detailed security risk information. Any of many different types and layouts of the network map 66 may be used to present results of a risk analysis. A graphical representation of a network in which assets and risks are shown using icons or images, text, or some combination thereof, may provide a most effective indication of a current security state of the network. In some embodiments, the format and layout of the network map 66 is in accordance with previously established user interface settings stored in the user interface database 88.

The network map 66 may thus display any of multiple views of a system, including service and asset interdependencies, while concurrently displaying the results of security risk aggregation functions in an intuitive way. Examples of risk aggregation functions are discussed in further detail below. Other functions might also be used to provide security risk and/or other types of information to be included in consolidated service-level representations. These representations may be displayed in the network map 66 or presented to a user in some other form.

A Security State Visualization (SSV) tool may be supported by the network map 66, another component of the user interface 52, or by a component of the security module 54, for managing service-level map views of an information system. A map view may be presented in a displayed representation in the form of a series of icons and connections showing service and asset interdependence, as well as service security risks and possibly security risks to other assets. Indications of service and/or asset security risks may be provided as attribute states, which are described in further detail below with reference to FIGS. 6-9. In some embodiments, the SSV supports functions to customize a color-coded representation of security risk attributes associated with a service and/or its related assets. The SSV tool may also facilitate the display of groups of assets and/or services and the collective state of each group.

The specific information that is provided in a particular view may be controlled through a View Selector Navigator (VSN) component that may be supported by the network model manager 74. In this case, the VSN is used by the SSV to navigate through various service level views in a similar way that the network model manager 74 is used by the network map 66 to navigate through various network views. The VSN determines the information required for a view, based on a service and level to be viewed and the assets that are related to that service, which may be selected via the configuration interface 64, and retrieves the information from the asset database 84 and the security state database 86. Any information available concerning a service and its related assets, including specific security risk information determined by the risk analyzer 76, may be retrieved by the VSN. A consolidated representation of a service, including security risk and service/asset relationship information, is generated by the SSV based on the information provided by the VSN. The VSN may also interact with the risk analyzer 76 to obtain the security risk information that is to be presented in a service-level view.

The present invention is in no way limited to any particular type of representation or output. For example, indications such as alarms or warnings, which may be provided locally through the user interface 52 or transmitted to a remote system such as a pager or an e-mail client for instance, are also contemplated.

The risk analyzer 76 may provide security risk information to either or both of the report manager 78 and the security state database 86, and in some embodiments, to other components that generate consolidated representations of services. In FIG. 3, the risk analyzer 76 is operatively coupled to both the report manager 78 and the security state database 86. Outputs from the risk analyzer 76 may instead be provided to the security state database 86 through the report manager 78. Another possible option would be to operatively couple the risk analyzer 76 and the report manager 78 to the security state database 86. In this case, outputs from the risk analyzer 76 are provided to the security state database 86, and information in the security state database 86 is then accessed by the report manager 78 to provide reports to a user through the report interface 68.

The report interface 68 may also receive risk report selection inputs from a user for configuring reports of the risks determined by the risk analyzer 76. Risk report selection inputs may control the content, format, or both, of reports generated by the report manager 78. Responsive to risk report selection inputs received through the report interface 68, the report manager 78 accesses security risk information, in the security state database 86 for instance, and generates a customized report for a user.

As noted above, any of various configuration tasks may be performed by a user through the configuration interface 64. A user might enter network configuration information associated with vulnerabilities, assets, or both, for example, so as to effectively change the communication network being analyzed. The configuration interface 64 may also be used to enter risk analysis configuration information for configuring an analysis process applied to the vulnerabilities and assets by the risk analyzer 76. The risk analysis process is adapted in accordance with risk analysis configuration information provided by a user. Risk analysis adaptation may involve selecting specific types of risk calculations or parameters therefor, for example.

Embodiments of the invention also provide for selection of particular information system features, illustratively services, for security risk analysis. For instance, a user may be interested in assessing risk for a specific service provided by a communication network.

Once a service has been selected, the risk analyzer 76 identifies assets that have a relationship with the selected service, and determines vulnerabilities which affect the selected service or the identified assets, illustratively by accessing the databases 82, 84. The risk analyzer 76 then determines risks to the selected service by analyzing the vulnerabilities and assets. An indication of the determined security risks may then be provided through the network model manager 74, the report manager 78, or both.

In one embodiment, the risk analyzer 76 is implemented as a Security State Engine (SSE), which determines security risks to particular assets and also aggregates security risks from multiple contributing assets that are either themselves related to the selected service or related to other assets that are related to the selected service. In order to track "Root Cause" contributors to a service security risk, the SSE maintains a record of contributors such as cause-and-effect chains for each security risk that is propagated to a service based on asset relationships. Other methods to maintain a list of root cause contributors could also be provided.

Figure 4:
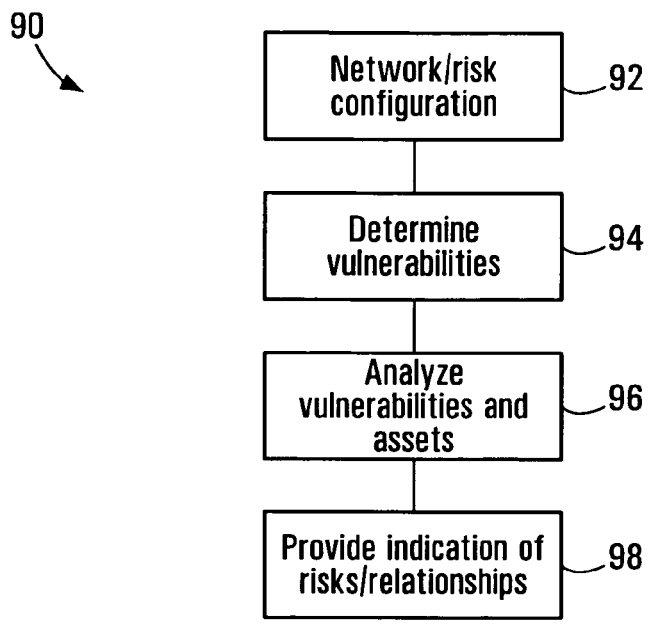
FIG. 4 is a flow diagram illustrating a security risk management method.

Embodiments of the invention have been described above primarily in the context of a system. FIG. 4 is a flow diagram illustrating a security risk management method.

The method 90 begins at 92 with an operation of network and/or risk configuration. This operation may involve, for example, any or all of populating or updating vulnerability and/or asset information, selection of one or more specific features such as a service for security risk analysis, and adaptation of a risk analysis process.

Where a specific network service is specified at 92, vulnerabilities affecting the selected service and/or any assets that have a relationship with the selected service, are determined at 94, and the vulnerabilities and assets are analyzed at 96 to determine risks to the service. Indications of the determined risks and the relationships between the service and assets is provided at 98 in a consolidated representation of the service.

It should be appreciated that the method 90 is intended solely for illustrative purposes, and not to limit the scope of the invention. Embodiments of the invention may be implemented with fewer or further operations than those shown in FIG. 4, or the illustrated operations may be performed in a different order. For example, any or all of the operations in the method 90 might be repeated when network vulnerabilities and/or assets are updated or for different simulation scenarios.

Analysis of assets and vulnerabilities by the risk analyzer 76 to determine security risks to a service involves risk exposure calculations that consider relationships between assets, which may include other services, that are involved in providing the service. Through these relationships, the effects of vulnerabilities and risks are propagated to a service from the underlying assets through which the service is provided. Propagation of vulnerabilities allows risk analysis to take into account vulnerabilities which affect not only a particular service, but also those which affect other assets that have relationships with the service. A determination of risk for a service may thus be based on both its own vulnerabilities, if any, and the propagated vulnerabilities which affect assets related to the service. Therefore, the effects of vulnerabilities, risks, or both, may be propagated, and references herein to propagation of vulnerabilities and risks should be interpreted accordingly.

Embodiments of the invention may allow risk propagation through multiple levels of asset relationships up to a service level. A risk analysis procedure may thus identify not only those assets that have a relationship with a service, but also those assets that have relationships with assets that have relationships with the service, and so on.

Figure 5:
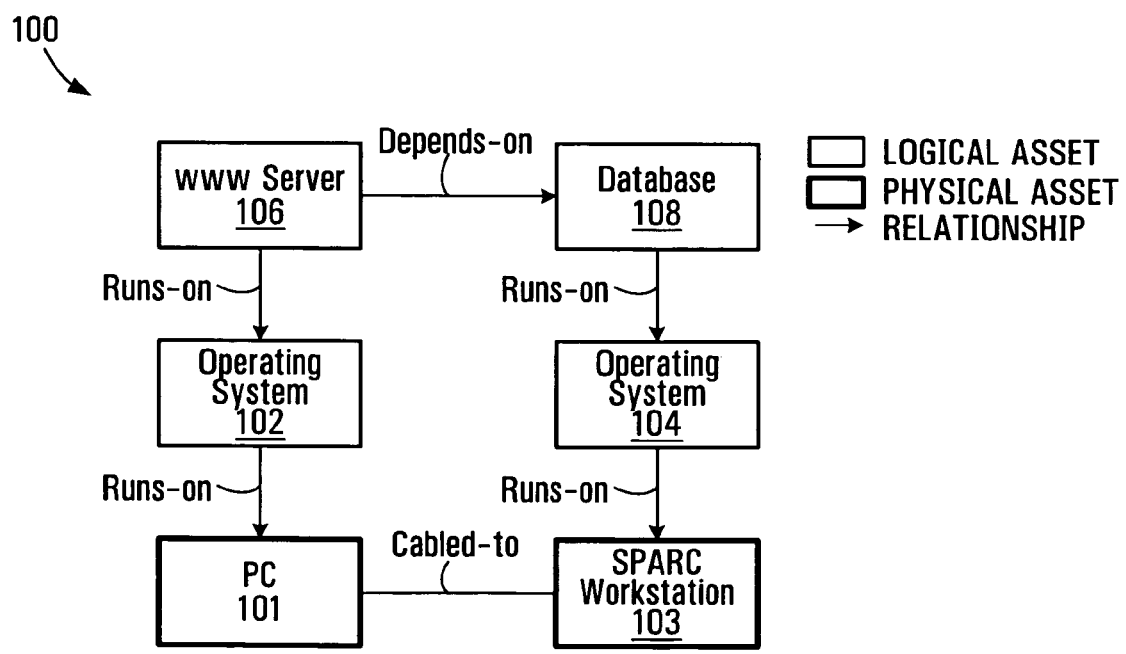
FIG. 5 is a block diagram illustrating types of interdependent assets.

In regard to risk propagation, it may be useful to first consider relationships which may exist between types of assets. FIG. 5 is a block diagram illustrating types of assets, as well as examples of how assets may be related to other assets, i.e., inter-asset relationships.

As noted above, an asset may be a physical or logical component of a communication network. In the system 100 of FIG. 5, the personal computer (PC) 101 and the SPARC workstation 103 are physical assets, and the operating systems 102, 104, the Internet (WWW) server 106, and the database 108 are logical assets.

Relationships between these assets are also shown in FIG. 5. An information system is described by not only assets, but also the relationships between them. A relationship describes how assets are interconnected and/or their functional dependencies.

In FIG. 5, the PC 101 and the workstation 103 have a "cabled-to" relationship, indicating that these assets communicate through some sort of communication link, such as a physical connection through a communication network. The operating systems 102, 104 are executed by processors at the PC 101 and the workstation 103, and thus have a "runs-on" relationship with the PC 101 and the workstation 103, respectively.

The server 106 and the database 108 are supported by software which is also executed by processors in the PC 101 and the workstation 103. As this type of software would normally be executed by or within the operating systems 102, 104, the server 106 and the database 108 have a "runs-on" relationship with the operating systems 102, 104, respectively.

Another type of relationship is illustrated in FIG. 5 between the server 106 and the database 108. The server 106 may provide an inventory system which accesses inventory information stored in the database 108, for example. The server 106, or a function it supports, is thereby dependent upon, and thus has a "depends-on" relationship with, the database 108.

In one embodiment, relationships between assets may be represented in a two-stage manner. First, the relationship itself is represented in terms of its type, including "cabled-to", "runs-on", and "depends-on" and the numbers of assets between which the particular relationship may exist. The "cabled-to" relationship in FIG. 5, for example, is of type "cabled-to", and requires at least two endpoint assets. Security parameters, described in further detail below, may also be included in the specification of a relationship.

Once a relationship has been defined, the assets which are part of a particular relationship are linked to the relationship. For some types of relationship, the asset to relationship link may also indicate whether the asset is a "from" member or a "to" member of the relationship. The "from" and "to" information is used for relationships such as "runs-on", where the "from" member is the running member, and the "to" member is the member which the running member is being run on. In FIG. 5, the operating system 102 is the "from" member and the PC 101 is the "to" member of the relationship between the operating system 102 and the PC 101, as indicated by the direction of the arrow between these assets. For a "depends-on" relationship, the "from" member depends on the "to" member. For types of relationships having equivalent members, such as "cabled-to" relationships, the "from" or "to" value can be assigned "not applicable" or the like.

The present invention is not restricted to this type of definition of a relationship. The above definition is provided solely as an illustrative example.

Other types of assets and relationships may also exist in a communication network or other system for which risk is to be assessed.

For example, in order to present a service-level view, an additional service to asset relationship is provided beyond the asset to asset relationships shown in FIG. 5. This service to asset relationship is referred to herein as a "composed-of" relationship, and is used to define the physical and logical assets that make up a service.

Figure 6:
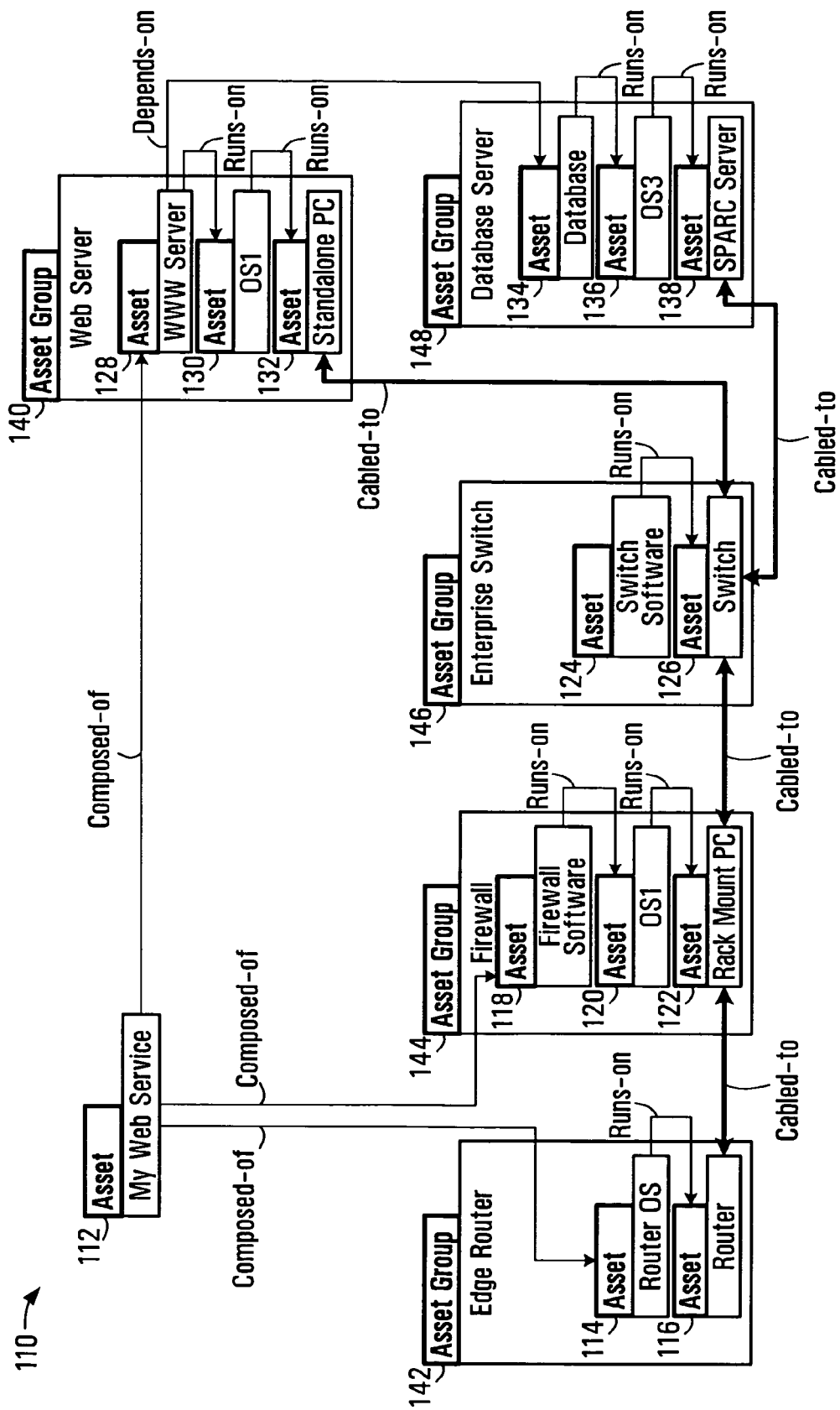
FIG. 6 is a block diagram illustrating a service, assets, and relationships therebetween.

FIG. 6 is a block diagram illustrating a service, assets, and relationships therebetween. In the example 110, a service 112 is shown as having "composed-of" relationships with assets 114, 118, 128. These assets also have relationships with other assets, which thereby have indirect relationships with the service 112. Assets that have "runs-on" relationships with each other are shown in FIG. 6 in asset groups 140, 142, 144, 146, 148. Inter-group relationships in the example shown in FIG. 6 include "cabled-to" and "depends-on" relationships.

The edge router asset group 142 includes a router operating system (OS) asset 114 that has a "composed-of" relationship with the service 112 and a "runs-on" relationship with a physical router asset 116. In one embodiment of the invention, both of the assets 114, 116 are considered in a security risk analysis for the service 112. The asset 114 has a relationship with the service 112, and the asset 116 has a relationship with the asset 114, and thus a security risk to the asset 116 can potentially affect the service 112.

In the firewall asset group 144, the firewall software asset 118 has a "composed-of" relationship with the service 112 and a "runs-on" relationship with the OS1 asset 120, which in turn has a "runs-on" relationship with the rack mount PC asset 122. The rack mount PC asset 122 also has respective "cabled-to" relationships with the router asset 116 and the switch asset 126. Risks may propagate from the assets in the firewall asset group 144, and similarly from the assets in the edge router asset group 142, to the service 112 through each group's "composed-of" relationship with the service 112 and/ or through the other group's "composed-of" relationship with the service 112 where risks are propagated across the "cabled-to" relationship between the assets 116, 122.

The enterprise switch asset group 146 is somewhat of a special case in that none of its assets have a "composed-of" relationship with the service 112. The switch asset group 146 is important because it is the only way that the web server asset group 140 can communicate with the database server asset group 148. The service 112 thus indirectly depends on the switch asset group 146 even though the switch asset group 146 does not include assets in the "composed-of" list or any of the "depends-on" relationships shown in FIG. 6. In general, for a complex information system, it would be virtually impossible to detect the particular switch/router/hub through which such an indirect dependency may exist, as noted in U.S. patent application Ser. No. 11/232,004 referenced above, for example.

The switch software asset 124 has a "runs-on" relationship with the physical switch asset 126, which has "cabled-to" relationships with the assets 122, 132, 138 in the asset groups 144, 140, 148. Since the asset groups 144, 140 include assets that have "composed-of" relationships with the service 112, the assets 124, 126 may be included in a security risk analysis for the service 112.

Asset relationships may similarly allow risks to propagate from the database server asset group 148 to the service 112. The database asset 134 has a "depends-on" relationship with the server asset 128, which has a "composed-of" relationship with the service 112. The database asset 134 also has a "runs-on" relationship with the OS3 asset 136, which has a "runs-on" relationship with the SPARC server asset 138. The SPARC server asset 138 has a "cabled-to" relationship with the switch asset 126, which has "cabled-to" relationships with the assets 122, 132, through which risks may be propagated back to the service 112 through other relationship paths.

As will be apparent from the foregoing, risks may propagate from the assets in the web server asset group 140 to the service 112 through the server asset 128, which has a "composed-of" relationship with the service 112, and/or through the "composed-of" relationships between the service 112 and assets 114, 118. The server asset 128 has a "depends-on" relationship with the database asset 134 in the database server asset group 148 and a "runs-on" relationship with the OS2 asset 130, which has a "runs-on" relationship with the physical standalone PC asset 132. The PC asset 132 has a "cabled-to" relationship with the switch asset 126.

The "composed-of" relationships may be configured and modelled in a substantially similar manner as the "cabled-to", "runs-on", and "depends-on" relationships. In some embodiments, asset groups are also modelled.

The present invention is in no way limited to the particular asset and relationship examples of FIGS. 5 and 6. For example, these Figures show only one-to-one relationships for software application assets on operating system and hardware assets. This is only for the purposes of illustration. Each operating system or hardware asset may have multiple related software applications, and accordingly a risk to one application may affect another application. It is not uncommon, especially for small companies, to provide a web server and an e-mail server on the same platform, for instance. This means that a vulnerability of the web server may affect the e-mail server as well.

It should also be appreciated that some information systems may include inter-services compositions. This enables multiple levels of services to be defined and combined into a higher level services representation. Services that are composed of other services are described in further detail below with reference to FIG. 8.

It is also possible for multiple physical assets to be in the same asset group. This is useful for such purposes as load-balancing, where there is a pool of units and each of the units can perform all of the functions. A risk calculation can take into account that some minimum number of units is needed for "normal" operation.

The service/asset and inter-asset relationships shown in FIGS. 5 and 6 are also not intended to limit the present invention in any way. Relationships between asset groups and other asset groups, or between asset groups and services or other types of asset, are also contemplated.

Although described briefly above, service-level risk analysis can now be considered in further detail with reference to FIGS. 3 and 6. The various relationships between a service and assets, and possibly relationships between those assets and other assets, may be used by a risk analyzer 76 (FIG. 3) or SSE to identify one or more assets of an information system that have respective relationships with the service.

According to one embodiment, when a security risk analysis is to be performed for the service 112 responsive to a user selection of the service through the configuration interface 64 for instance, the risk analyzer 76 obtains information for the service from the asset database 84. This information may include information on the service 112 itself, as well as information specifying at least the "composed-of" relationships associated with the service, from which the assets 114, 118, 128 can be identified.

The risk analyzer 76 then determines one or more security risks to the service 112 by analyzing security vulnerabilities associated with the identified assets 114, 118, 128. This determination may take into account not only the particular assets 114, 118, 128 that have respective relationships with the service 112, but also other assets that have respective relationships with those particular assets. Risks may propagate to the service 112 from assets that might not themselves have a "composed-of" relationship with the service, as described above. Any or all of the assets shown in FIG. 6 may thus be identified by the risk analyzer 76 based on relationship information stored in the asset database 84.

The determination of security risks may involve aggregating security risks from multiple assets. Security risks associated with the assets in an asset group, for instance, may be aggregated into an aggregated group security risk. Asset or aggregate security risks between asset groups may also be aggregated, depending on relationships. In FIG. 6, for example, aggregated risks may be determined for each of the asset groups 140, 142, 144, and further aggregated to determine a security risk to the service 112. In this sense, risk aggregation can be considered a form of risk propagation. Examples of aggregation functions are described in further detail below, although other aggregation functions than those explicitly described herein may be used for this purpose.

Aggregated security risks provide an indication of overall security risk to an asset such as a service that has relationships with other assets. However, it may also be desirable to have knowledge of specific contributors to an aggregated risk, so as to facilitate root cause analysis or investigation of possible remedial actions, for example. To this end, the risk analyzer 76 may also maintain a record of any or all contributing assets where security risks to multiple contributing assets are aggregated to determine an aggregated security risk. Contributing assets could be tracked to virtually any level of detail, although assets that contribute most significantly to an aggregated security risk might generally be of the most interest.

For example, the risk analyzer 76 could store an identifier of the contributing asset associated with the highest security risk value that was combined with other security risk values to determine an aggregated security risk. In some embodiments, this type of record is kept for each aggregated security risk. With reference to FIG. 6, respective records of one or more contributing assets could be kept for each aggregated risk calculated for the asset groups 140, 142, 144, 146, 148, and also for the overall aggregated security risks determined for the service 112.

After the risk analysis has been completed, a consolidated representation of the service is provided through an interface that is operatively coupled to the risk analyzer 76. As described above, the network model manager 74 and the network map 66, the report manager 78 and the report interface 68, and an SSV and a VSN are illustrative example embodiments of this interface. The consolidated representation includes an indication of the determined security risk(s) and an indication of the respective relationships between the service and each of the identified assets. Examples of consolidated representations are described in further detail below with reference to FIGS. 7-9.

It should be appreciated that the interface through which the consolidated representation is provided could be operatively coupled to the risk analyzer 76 in any of various ways. In the case of the report manager 78 and the report interface 68, information associated with the determined security risks(s) might be received by the report manager from the risk analyzer 76. An SSV/VSN implementation may instead retrieve security risk information from the security state database 86, and thereby be indirectly logically coupled to the risk analyzer 76.

These two schemes for obtaining security risk information, including real-time generation by the risk analyzer 76 and a store/access mechanism whereby the risk analyzer stores security risk information in the security state database 86 for subsequent access, also illustrate that security risk information may be presented when it is generated or at some later time. For example, a user might request that a risk analysis be performed by the risk analyzer 76 and view the results of that analysis when the analysis has been completed. In some cases, a risk analysis for a selected service might already have been completed by the risk analyzer 76. The risk analyzer 76 could update the security state database 86 every time a relevant event is received by the event manager 72, for example. In this case, security risk information that was previously generated can then be obtained from the security state database instead of running the risk analyzer 76 every time a user wishes to display a service-level view. A consolidated representation of a service thus need not necessarily be displayed upon completion of a risk analysis for that service.

It is also possible that a security risk assessment or management tool may support both real-time risk analysis and store/access schemes. This would allow such functionality as invoking a risk analysis procedure when a user wishes to display a service-level view of a service for which a risk analysis has not previously been completed, but obtaining security risk information for a service from the security state database 86 when such information is available and current, for example.

Figure 7:
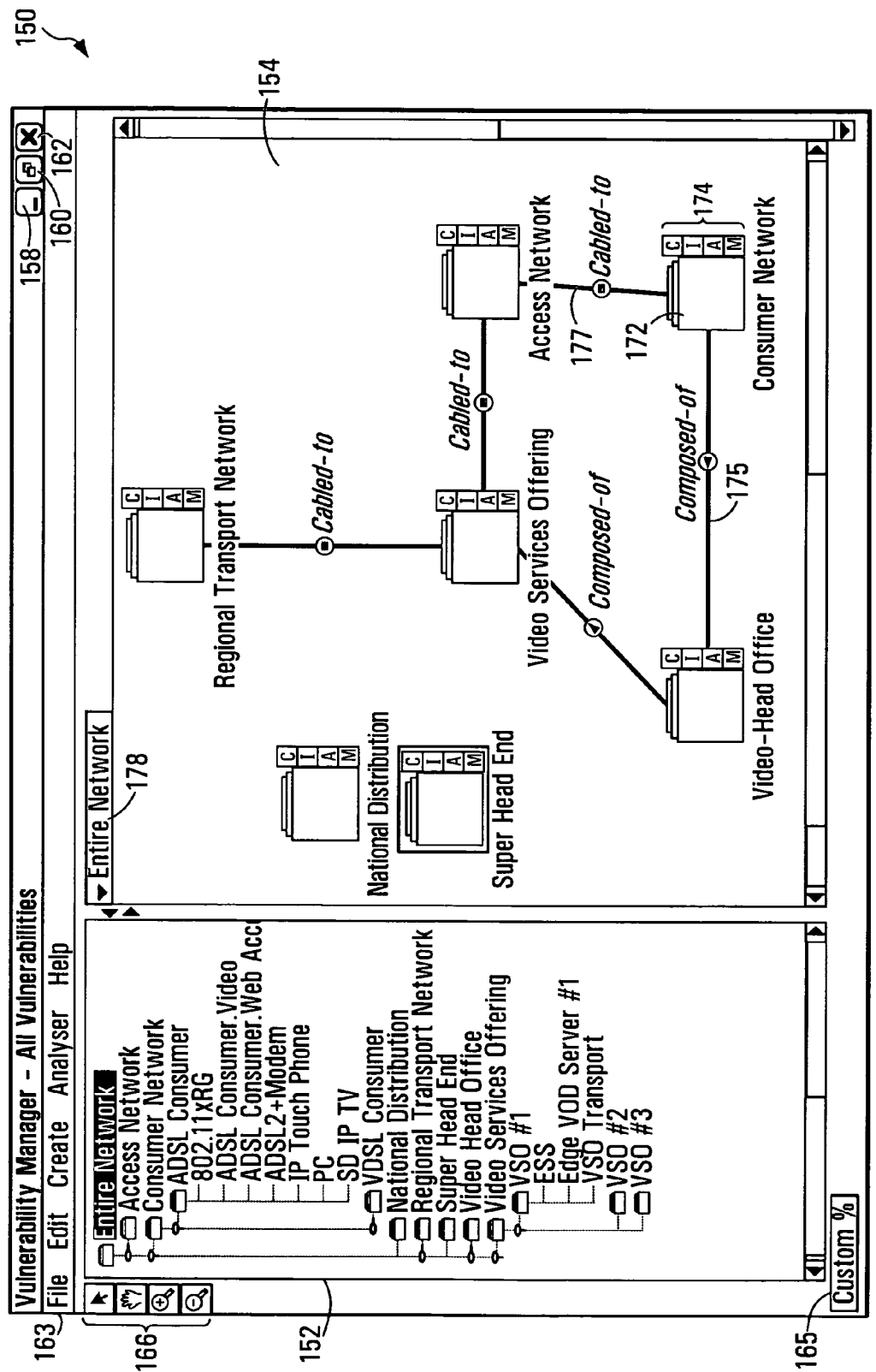
FIG. 7 is a block diagram of a Graphical User Interface (GUI) providing a consolidated representation of a service.

FIG. 7 is a block diagram of a GUI providing a consolidated representation of a service. The example display window 150 shown in FIG. 7 presents a higher layer service-level view, which includes a directory tree 152 of modelled assets in an information system, and a consolidated representation 154 of a service. Various other graphical elements are also shown in FIG. 7, including minimize, maximize, and close buttons 158, 160, 162, menu items 163, pointer, "grasp", and zoom buttons 166, and a pulldown menu 165 for selecting a custom zoom factor.

The consolidated representation 154 includes an element 178 that indicates the layer or level of the current view. In this example, an entire communication network is shown in the representation 154.

FIG. 7 demonstrates the use of the "composed-of" relationship to define services. In order to avoid overly complicating the drawing, only one service and its relationships have been designated with reference numbers in FIG. 7. As shown, a consumer network service represented by the icon 172 is composed of a video head office service, which is in turn composed of the video services offering. An indication of the "composed-of" relationship between the consumer network service and the video head office service is shown in the representation 154 as a link 175.

Some of the services at the level being viewed in FIG. 7 represent groups of lower-level assets that have additional dependent relationships with other assets at the lower level(s). A "cabled-to" relationship between lower level assets of the consumer network service and the access network service is shown at 177. Other "cabled-to" relationships are similarly shown between the video services offering and the regional transport network service, and between the video services offering and the access network service. The "cabled-to" and "composed-of" relationships are shown in different ways, in this example using different symbols on the links representing the relationships. Any other dependent relationships, such as "runs-on" and "depends-on" relationships, may also be displayed.

Indicators of security risk to each service are shown in FIG. 7 at one side of the service icons. The indicators 174 provide an indication of security risks to the consumer network service in terms of a confidentiality risk (C), an integrity risk (I), an availability risk (A), and an overall security state of the service, shown as a magnitude (M). These indicators are described in further detail below with reference to FIG. 9.

Additional information may also be presented in a consolidated service view. The entire network view shown in FIG. 7 includes a national distribution service and a super head end service, which are modelled at the same hierarchical network level as the other services but do not have relationships with those services.

Figure 8:
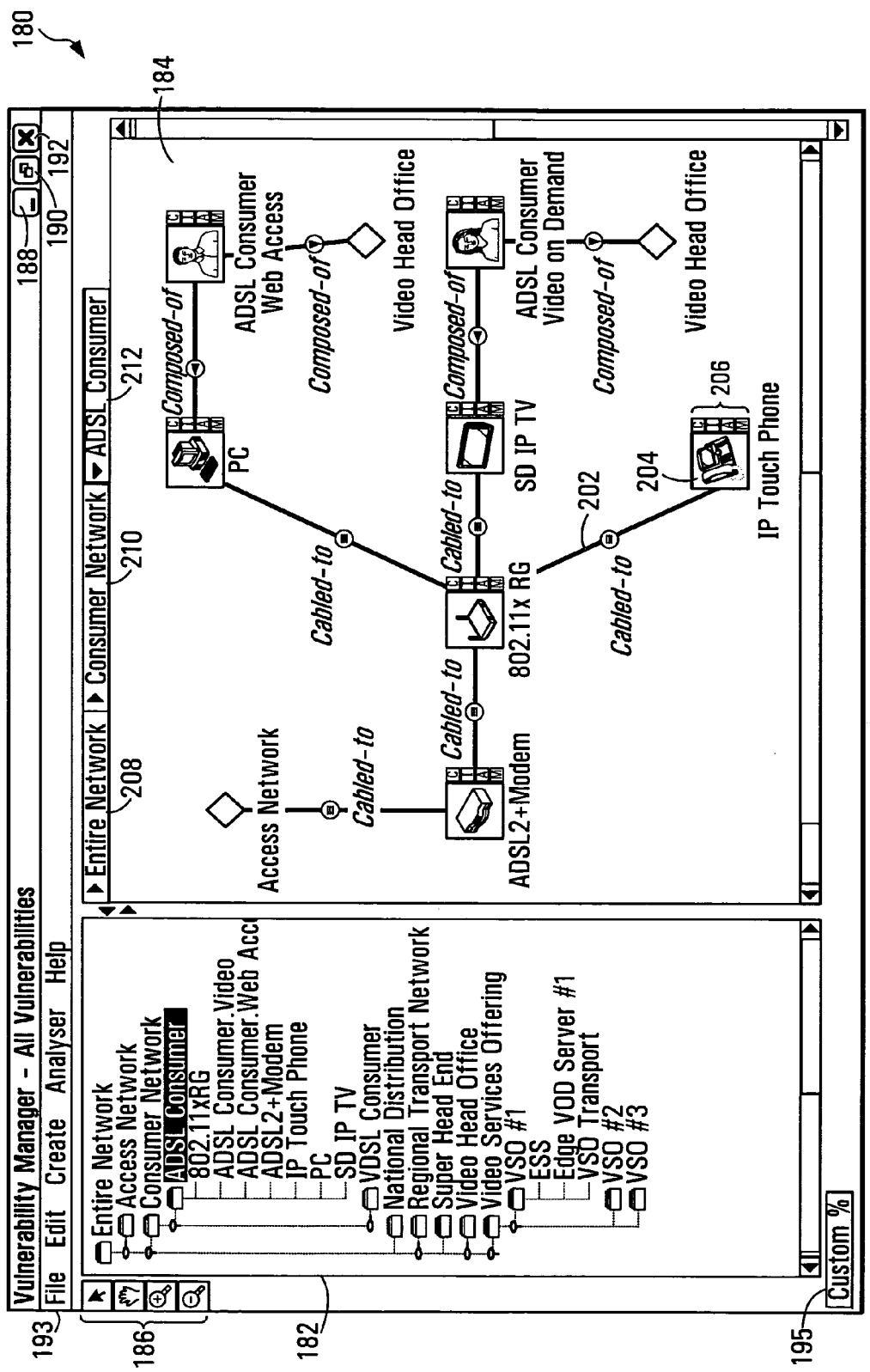
FIG. 8 is a block diagram of another GUI providing a representation of a lower level of a service.

Another aspect of the invention allows a user to navigate down into lower-layer views. This function may be provided by an SSV and VSN, for example. FIG. 8 is a block diagram of another GUI providing a representation of a lower level service view. The lower level view of FIG. 8 may be accessed, for example, by double-clicking on an asset icon in the next higher level view to reveal the lower level details, single-clicking on an asset name in the tree directory 182, etc.

Like the window 150 of FIG. 7, the example display window 180 shown in FIG. 8 includes a directory tree 182 of modelled assets in an information system, and a consolidated representation 184 of a service. The representation 184, however, is at a different layer or level than the representation 154. As shown at 208, 210, 212, the representation 184 shows an ADSL consumer service that is part of the consumer network service of the network. The window 180 also includes minimize, maximize, and close buttons 188, 190, 192, menu items 193, pointer, "grasp", and zoom buttons 196, and a pulldown menu 195 for selecting a custom zoom factor.

Indications of security risks to assets and services that make up the ADSL consumer service are also provided. Assets are shown as icons such as 204, relationships are shown as links such as 202, and security risks are shown using C, I, A, and M indicators such as 206.

FIG. 8 further demonstrates the concurrent display of both service-level "composed-of" relationships, as well as physical topology illustrated by "cabled-to" relationships. Other relationships such as "runs-on" and "depends-on" relationships could also be displayed if they existed from the assets in the ADSL Consumer service.

The consolidated representations 154, 184 thereby provide an indication of security risks to a service, in different levels of detail, as well as indications of at least some of the relationships through which a service can be affected by security risks to related assets. These related assets may include other services.

The particular risks and relationships shown in a view may depend on the level of the view. In FIG. 7, the security risks displayed at 174 for the consumer network service are aggregated risks, whereas in FIG. 8, security risks that may affect the consumer network service are displayed in the form of risks to the underlying assets involved in providing the consumer network service. Some of the risks and relationships within the ADSL consumer service represented in FIG. 8 are internal to the consumer network service and thus have not been shown in the top-level view of the consumer network service in FIG. 7. The "cabled-to" relationship with the access network service and the "composed-of" relationship with the video head office service, however, are shown in both FIG. 7 and FIG. 8.

For further clarification of the representations in FIGS. 7 and 8, the consumer network service shown at 174 is a service that has relationships, "composed-of" relationships in this case, with two other services. As shown at 152, 182, the consumer network service is composed of an ADSL consumer service and a VDSL consumer service. The ADSL consumer service is in turn provided by the underlying assets shown at 152, 182 and in the representation 184 of FIG. 8. The assets included in the representation 184 have either "composed-of" relationships with the ADSL consumer service or some other types of relationships with the "composed-of" assets.

Figure 9:
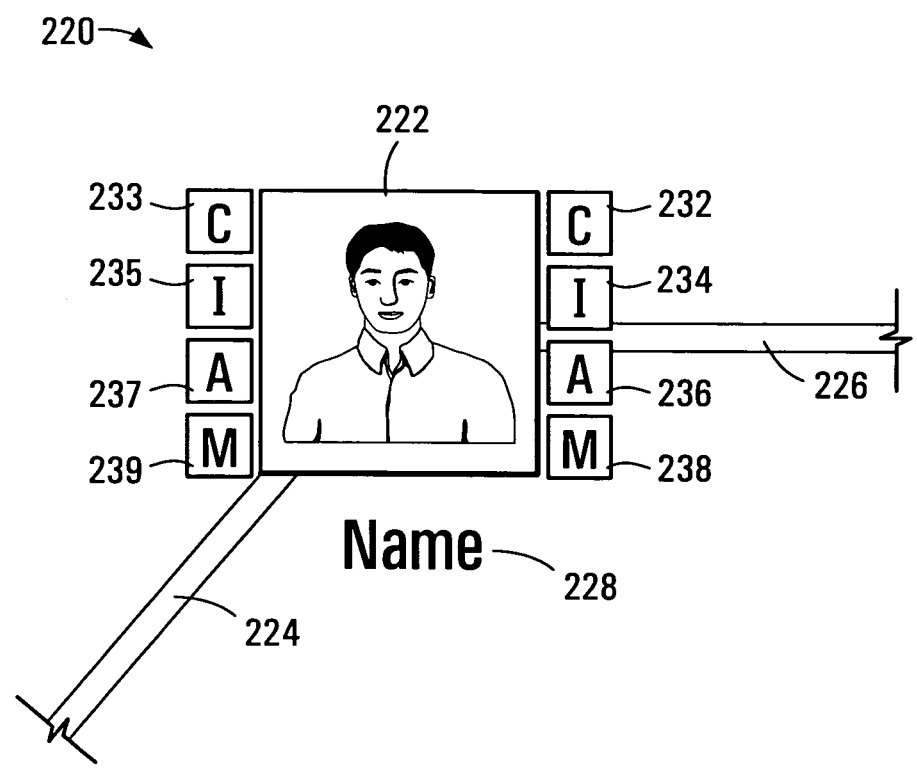
FIG. 9 is a block diagram of an icon.

FIG. 9 is a block diagram of an asset icon 220, which may be displayed in a service risk GUI. The asset icon 220 includes an asset symbol 222, which may vary by asset type, an asset name 228, and sets of security risk or state indicators 232, 234, 236, 238 and 233, 235, 237, 239. Links 224, 226 connecting the icon 220 to other icons so as to represent relationships are also shown.

The indicators 232, 234, 236, 238, and also the indicators 233, 235, 237, 239 described in further detail below, highlight the ability to concurrently display an overall security state M, as well as C, I, A sub-states that comprise the overall state. In order to avoid overly complicating the present description, only one of the two sets of indicators 232, 234, 236, 238 and 233, 235, 237, 239 is explicitly described below. It should be appreciated that risk information for the other set of indicators can be determined and displayed in a substantially similar manner.

All of the security states corresponding to the indicators 232, 234, 236, 238 are determined during risk analysis. Although the example icon 220 includes indicators 232, 234, 236 of three key attributes, namely confidentiality, integrity, and availability, other embodiments could include additional or different attributes such as Quality of Service (QoS), Bandwidth, and/or other network or security parameters.

The states represented by the indicators 232, 234, 236 for a service may be calculated from the key attribute values contributed by dependent "composed-of" assets. In addition, the overall security state of the service, displayed in the icon 220 by the M indicator 238, may be calculated based on the service key attributes and/or the overall security states of "composed-of" assets.

Security risk/state indicators may have different display characteristics, illustratively different colors, to convey potential security problems. The color or another display characteristic of the symbol 222 might also be used to indicate potential problems. The color of the symbol 222 might be matched to the color code of the magnitude attribute indicator 238, for example. Another option might be to display the icon symbol in a trouble or alert color where any of the indicators 232, 234, 236, 238 indicate a certain level or value of security risk. The indicator and/or symbol color code may be configurable through a menu or other user interface, or embodied as a hard coded value for instance.

In some embodiments, the icon 220 displays different types of risk to a service or asset. A risk arising from a vulnerability to an asset that has a "composed-of" relationship with a service might be represented in a different manner than a risk that arises from a vulnerability to an asset that does not itself have a "composed-of" relationship with the service. Considering the asset groups 146, 148 of FIG. 6, for example, even though the assets of these asset groups do not have "composed-of" relationships with the service 112, vulnerabilities affecting these assets can cause risks to the service 112. Risks caused by vulnerabilities that affect a service through this type of multiple-level relationship path could be shown differently than risks that affect a service through a single "composed-of" relationship.

The different types of risk may be represented using the respective sets of indicators 232, 234, 236, 238 and 233, 235, 237, 239 in FIG. 9. Risks that affect "composed-of" assets of a service might be represented by the indicators 232, 234, 236, 238 on one side of the asset symbol 222, with other risks being represented by the indicators 233, 235, 237, 239 on the opposite side of the asset symbol. Other layouts and mechanisms for representing different types of risks are also possible.

As described above, it may be desirable to investigate the series of relationships through which a security risk propagated to a service or asset. In accordance with an aspect of the invention, a record of one or more contributing assets is maintained when risks to multiple assets are aggregated. Such a record might be made accessible through the icon symbol 222, name 228, or the indicators 232, 234, 236, 238 and 233, 235, 237, 239, for example, in which case the indicators not only indicate security states, but are also functional graphical elements. In one embodiment, a popup menu displayed when one of the indicators is right-clicked allows a user to view contributors to that risk. Contributors could be displayed in a list, highlighted in a representation of a service, or presented to a user in some other form. The user can then determine, in an information system, the origin of a security risk.

Other "trace" mechanisms are also contemplated. A user might select an asset to display a menu for accessing information, which may include for example a list of services that may be affected by risks to the asset. A function to trace effects in the opposite direction, to list the other assets that may potentially affect an asset, is also provided in some embodiments. Security risks that may be propagated through a particular relationship might similarly be displayed by selecting that relationship.

The above examples of security risk display functions are by no means exhaustive. Further functions may be or become apparent to those skilled in the art.

As described briefly above, relationships between assets may be used in a security risk analysis system or method to propagate security risks between related assets. Risk propagation, including risk aggregation functions, are now described in further detail.

The type of propagation between assets may be dependent upon the relationship between those assets. For example, a "depends-on" relationship between assets might indicate that one asset's availability depends on another asset's availability, but in the case of a "cabled-to" relationship, this might not be so. In the latter case, just because one asset is made unavailable does not necessarily mean that the other asset is unavailable. One example of this scenario would be two PCs connected to a network.

The risk analyzer 76 (FIG. 3), for example, may determine a vulnerability affecting an asset associated with a communication network, and propagate the effect(s) of the vulnerability from the asset to another asset which has a relationship with the asset. This propagation, and propagation in the reverse direction, may be applied between an asset and each other asset having a relationship with that asset.

A risk analyzer may also determine a security risk to the asset, and/or to the network, its services, and other network features, based on the vulnerabilities affecting the asset and the vulnerabilities propagated to the asset from the other assets.

Figure 10:
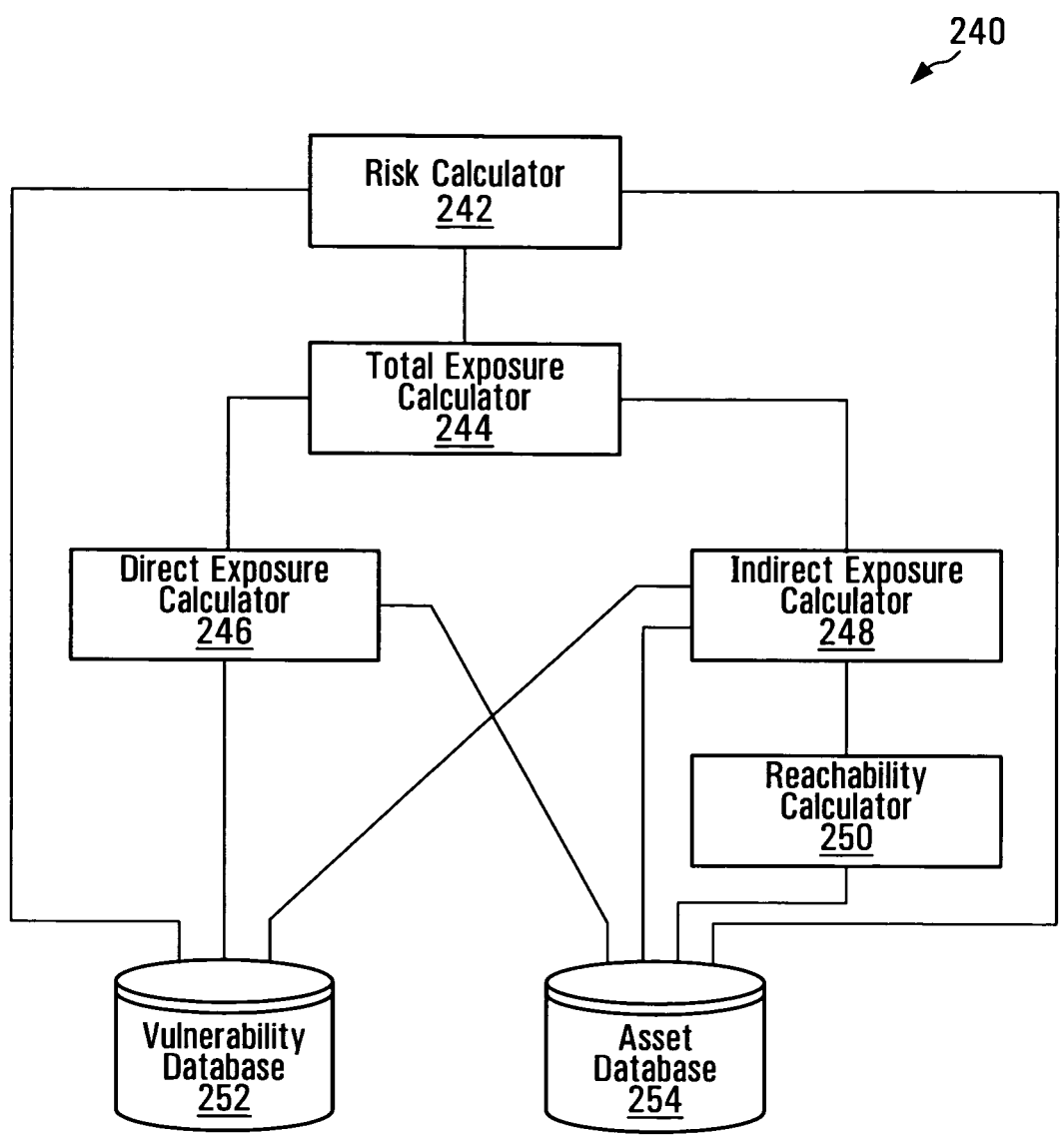
FIG. 10 is a block diagram of a risk calculation system.

FIG. 10 is a block diagram of a risk calculation system, which may be implemented in the risk analyzer 76 of FIG. 3, for example. The risk calculation system 240 includes a risk calculator 242, a total exposure calculator 244 operatively coupled to the risk calculator 242, a direct exposure calculator 246 operatively coupled to the total exposure calculator 244, a vulnerability database 252 operatively coupled to the risk calculator 242, to the direct exposure calculator 246, and to an indirect exposure calculator 248 which is also operatively coupled to the total exposure calculator 244, a reachability calculator 250 operatively coupled to the indirect exposure calculator 248, and an asset database 254 operatively coupled to the risk calculator 242, to the direct exposure calculator 246, to the indirect exposure calculator 248, and to the reachability calculator 250.

The calculators 242, 244, 246, 248, 250 may be implemented, for example, in software which is executed by a processor, although hardware-based embodiments and embodiments in which calculation functions are implemented using some combination of hardware and software are also contemplated.

The risk calculator 242 uses exposure and asset information to calculate a security risk to an asset, network service, or some other selected network feature. Exposure is a mapping between a given asset and the vulnerabilities which affect the asset. As noted above, a vulnerability is a condition in an asset's operation which makes it susceptible to an attack or failure. Other information, such as a threat value, may also be used by the risk calculator 242 in calculating risk. A threat value, which may be entered for an asset by a user for instance, is an indication that an asset may be harmed. For example, a PC which is not connected to a network and is in a highly guarded room might be tagged with a lower threat value than network-connected PCs even if there were several vulnerabilities in the software running on it.

An output of the risk calculator 242 is preferably multi-dimensional in nature. As network complexity increases with devices providing respective specific services, determined risk preferably reflects multiple facets or parameters of security, such as Confidentiality, Integrity, and Availability (C, I, A).

The security dimension(s) included in an output provided by the risk calculator 242 may be predetermined or configured by a user/owner through the configuration interface 64 (FIG. 3), for example. A user/owner might wish to evaluate security risk to a service which affects the service's availability. In this case, risk calculator 242 provides an output indicating the security risk to availability of the selected service.

Security dimension information may be provided in numeric format, as a number between 0 and 1 inclusive, indicating the level of importance or relevance of a security dimension to an asset, service, or other network feature. A triplet (1, 0, 0), for example, may be used to indicate a confidentiality risk, or as described below, that an asset has value for providing confidentiality in the network. It should be appreciated, however, that other indications may be used for security dimensions, such as indications of severity or importance of a risk, vulnerability, or asset with respect to each security dimension. The triplet (0.75, 0.50, 0.25), for instance, provides an indication that the C, I, A parameters have different levels of importance.

In the system 240, exposure may be calculated by the total exposure calculator 244 as a function of either or both of direct exposure and indirect exposure. Direct exposure is determined by the direct exposure calculator 246 based on vulnerabilities which directly affect an asset. The indirect exposure calculator 248 calculates a different type of exposure, indirect exposure, which propagates to an asset from related assets. For example, the effects of vulnerabilities associated with an operating system can propagate to any of its applications. In FIG. 5, the effects of vulnerabilities affecting the operating systems 102, 104 can propagate to the server 106 and the database 108, respectively. The indirect exposure calculator 248 uses information on relationships, assets, and reachability in its determination of indirect exposure to risks.

Reachability is determined by the reachability calculator 250 based on relationship and asset information. The reachability calculator 250 implements a function to calculate the exposure of a path between assets in the network. For example, the server 106 in FIG. 5 relies on physical connectivity between itself and the database 108 through the PC 101 and the workstation 103. The exposure to this connectivity is referred to herein primarily as "reachability".

The calculators in the system 240 may access the databases 252, 254 to obtain information on vulnerabilities and assets, and/or obtain information output from other calculators for use in further calculations, as in the case of the risk calculator 242 and the total exposure calculator 244. This set of calculators can be flexibly applied to risk calculations. Different user/owners or missions (business, government, military, and public for instance) may have different requirements or risk assessment scenarios.

The risk calculator 242, for example, which is operatively coupled to the direct and indirect exposure calculators 246, 248 through the total exposure calculator 244, may thus determine a security risk based on exposures determined by particular calculators selected for a current risk analysis operation. For example, a user might select a direct exposure analysis, in which case the direct exposure calculator 246 is selected.

Selection of calculators for a security risk analysis operation may be effected by explicitly selecting particular calculators or particular types of exposure to be analyzed, for instance, such as by entering risk analysis configuration information through a user interface. Calculator selection may also or instead be inherent in a type of risk analysis being performed. In one example, a network-wide risk assessment automatically causes all exposure calculators to be selected, whereas more targeted risk assessments may cause respective subsets of calculators to be selected. Other selection mechanisms are also contemplated, and may be apparent to those skilled in the art.

The effects of selection of a calculator may also be implementation-dependent. In some embodiments, a calculator is operative to calculate its corresponding type of exposure only if it is selected for a current risk analysis operation. Another possible implementation may have calculators which determine their corresponding types of exposure during every risk analysis operation, with another component, the total exposure calculator 244, for example, selecting one or more of the different types of exposure to include in total exposure calculations.

It should be appreciated that not every calculator need necessarily be selectable. A default or base calculator, illustratively the direct exposure calculator 246, might always be automatically selected and used in every risk analysis operation. In this case, the indirect exposure calculator 248 may be selectable to provide for flexibility in risk analysis.

Additional behavior-based components may also be combined with these calculators in a risk calculation system. A traversal agent or function, for example, may be used to determine the optimal order in which to process assets associated with a network during risk assessment.

According to one possible risk assessment scheme, each asset is processed sequentially with no regard for topology. In other schemes, assets might be processed in an order which is based on a more sophisticated algorithm which sequentially select assets based on, for example, asset relationships and asset paths, and/or attack paths. Risk propagation characteristics might also or instead be taken into account in determining a traversal order. A risk propagation characteristic could be used to restrict risk propagation to a maximum of two relationships for instance. In this case, assets which are more than two relationships away from an asset will see no effect of risk to that asset. The particular traversal order algorithm used during an analysis operation may be predetermined, or selectable or otherwise configurable by a user.

Another possible behavioral component is an asset vulnerability builder, which builds associations between vulnerabilities and assets. This component, with which the exposure calculators 246, 248 may interact to determine direct and indirect exposures, maps vulnerabilities to assets which they affect. Co-pending U.S. patent application Ser. No. 11/366, 100, referenced above, describes techniques that may be used in some embodiments to associate security vulnerabilities and assets.

The direct exposure calculator 246 calculates direct risk based on these mappings. Through relationships, the indirect exposure calculator 248 can determine which vulnerabilities, mapped to an asset by the asset vulnerability builder, propagate to other assets.

In some embodiments, the exposure calculators 246, 248 themselves map vulnerabilities to assets instead of using a separate asset vulnerability builder.

Asset to vulnerability mapping builds associations between assets of a network and known vulnerabilities. The asset and vulnerability databases 252, 254 store asset and vulnerability information which is accessed and processed to build these associations.

The mapping process may involve, for a specific asset, comparing asset information against an exploited resource. A resource may be a particular platform, identified in the asset and vulnerability databases by a name and version number. Other asset and vulnerability information may also be processed during asset to vulnerability matching. A platform vulnerability, as well as other types of vulnerabilities, may have other requirements such as a particular access mechanism which must be used to exploit the vulnerability. In this case, access mechanisms for the asset are compared to access mechanisms required by the vulnerability.

If the asset information matches the vulnerability information, then an association is created between the vulnerability and the asset. In the above example, an association would be created in the event of a match between asset and vulnerability platform names, platform versions, and access mechanisms. An association between an asset and a vulnerability may be created, for example, by storing an identifier of an affected asset with a vulnerability in the vulnerability database 252, storing an identifier of the vulnerability with the affected asset in the asset database 254, or storing identifiers of the affected asset and the vulnerability in a separate asset vulnerability table.

Asset relationships may be searched to determine whether each asset has a relationship with an asset that is directly affected by a vulnerability. An association may be made between the vulnerability and each asset that has a relationship with the directly affected asset. The depth and type of the relationship search may be user-specified, for example.

The above operations may be repeated for all vulnerabilities in the vulnerability database 252, and for all assets in the asset database 254.

The specific functions used by a risk analyzer or SSE to calculate total exposure or aggregated risks, which could include aggregated C, I, A attributes, aggregated magnitude, and/or other aggregated risks, may be hard coded or configurable, such as by selecting from a list of available functions presented in a menu. A menu option could allow selection from the set of aggregation functions available in a risk analysis system, for instance.

The set of aggregation functions may include any functional relationship between the security risks or particular key attributes of contributing assets, or between the aggregated key attributes resulting in an overall magnitude. Aggregation of key attributes into an overall magnitude may involve, for example, a maximum function, a minimum function, a sum function, a weighted sum, or other functions, such as those described in detail below. The overall magnitude may instead take into account only certain key attributes of an asset or service. Where a service is important for integrity for instance, the function for determining the overall security state for that service might be more highly weighted towards the integrity attribute than the confidentiality and availability attributes.

Considering examples of aggregation functions that may be used in some embodiments, the risk to an asset ($Risk_A$) may depend on a value of the asset ($Value_A$) and the probability that a weakness has been exploited against the asset ($Likelihood_A$). Suppose that an asset A is affected by k vulnerabilities $V_1 \ldots V_k$. Typically, the risk associated to this single asset is defined as follows:

$$Risk_A = Value_A \times Likelihood_A \quad (1)$$

$$Likelihood_A = Threat_A \times maximum\{Vulnerability(V_i) | 1 \leq i \leq k\}. \quad (2)$$

Here, $Value_A$ refers to the amount of loss or damage associated with the compromise of asset A. The likelihood equation (2) relies on a given hypothesis, which assumes that for each vulnerability $V_i$ that affects this asset, there must be an "exploited-by" relationship, either direct or indirect, between $V_i$ and this asset.

As indicated above, (1) and (2) are appropriate for a single asset. Suppose now that a service S depends on k assets $A_1 \ldots A_k$. If all assets $A_1 \ldots A_k$ have to be free of compromise, where compromise would result in loss or partial loss of Confidentiality, Integrity, Availability or some other system or security parameter at the asset, the risk associated with the respective service may be calculated as follows:

$$Risk_s = Value_s \times maximum\{Likelihood(A_i) | 1 \leq i \leq k\}. \quad (3)$$

Likelihood($A_i$) defines the probability that a vulnerability has been exploited against an asset $A_i$. Equation (3) relies on a given hypothesis, which assumes that if Likelihood($A_i$) <Likelihood($A_j$) then, for a given adversary with a given motive and capability, the likelihood reduces to the vulnerability level. As well, if an adversary has knowledge and/or many specialized resources to perform a low vulnerability attack, that adversary can also likely perform a high vulnerability attack.

If not all of the assets $A_1 \ldots A_k$ would have to be free of compromise, where redundant servers or databases are provided for resilience purposes for instance, the risk to the service may be calculated according to:

$$Risk_s = Value_s \times minimum\{Likelihood(A_i) | 1 \leq i \leq k\}. \quad (4)$$

A "cabled-to" relationship may represent, for example, an underlying network offering a network service. Therefore, if an asset a, such as the server 106 of FIG. 5 depends on an asset b, namely the database 108, there is an underlying assumption that the asset a can have access to asset b through an interconnecting network C represented by a path of "cabled-to" relationships. In such a case, the asset a depends on asset b and the interconnecting network C. Although the risk to asset a may be given by (1), the likelihood associated to network C might be evaluated using different techniques. U.S. patent application Ser. No. 11/232,004, referenced above, discloses techniques that may be used for evaluating risks where a path between two dependent assets includes multiple "cabled-to" relationships. Other techniques may also be used for this purpose.

Figure 11A:
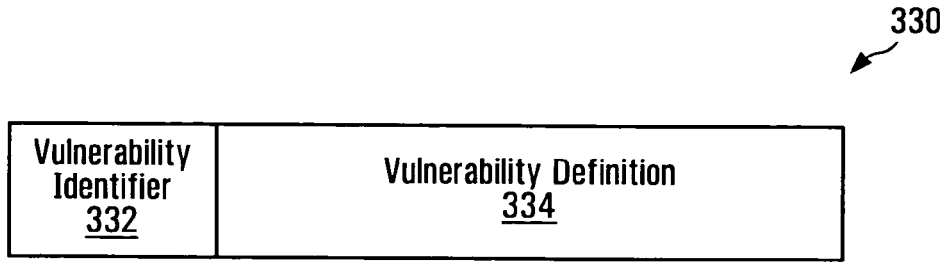
FIGS. 11A, 11B, and 11C are block diagrams of vulnerability, asset, and security state data structures, respectively.
Figure 11B:
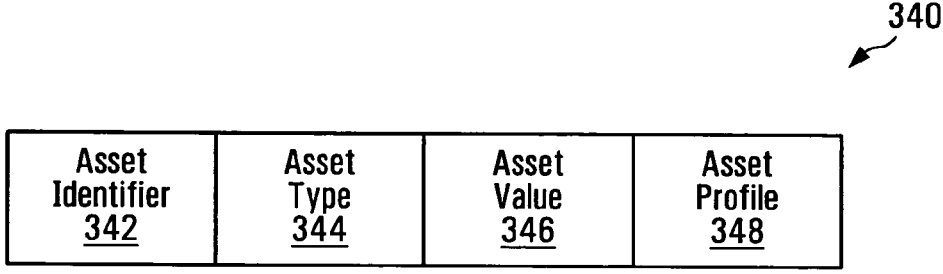

Risk analysis and aggregation functions in accordance with embodiments of the invention are dependent upon security vulnerabilities that affect assets, as well as relationships between information system assets. The process of determining vulnerabilities that affect assets may be facilitated by particular data structures used to store vulnerability and asset data. FIGS. 11A and 11B are block diagrams of vulnerability and asset data structures, respectively. Vulnerability and asset databases may include multiple records having the structures shown in FIGS. 11A and 11B.

As shown in FIG. 11A, a vulnerability data structure 330 used to store vulnerability information in a vulnerability database may include a vulnerability identifier 332, and a vulnerability definition 334. The identifier 332 identifies a vulnerability, illustratively by name, and the vulnerability definition 334 may include, for example, platform identifiers that identify hardware or software platforms that may be exploited or affected by the vulnerability. Platforms may be identified by name and version number for instance. The definition 334 may provide further vulnerability information such as its effect, illustratively as a numeric triplet in terms of the above (C, I, A) security dimensions, conditions such as an access mechanism which are required for the vulnerability to be exploited, etc. This information might be specified, for example, according to Application Vulnerability Definition Language (AVDL), Common Vulnerabilities and Exposures (CVE), and/or Common Vulnerability Scoring System (CVSS). Further vulnerability information options are also possible, and may be or become apparent to those skilled in the art.

A vulnerability data structure might also include some form of indication of vulnerability/asset associations. An asset identifier and type of association(s) may be added to a vulnerability data structure, for instance, when an asset is identified as being "exploited-by" or "affected-by" a vulnerability.

The asset data structure 340 of FIG. 11B includes an asset identifier 342, an asset type 344, an asset value 346, and an asset profile 348. The identifier 342 uniquely identifies the asset using a user-defined name for instance. The asset type field 344 may indicate the type of asset, as a physical or logical asset as described above, and/or provide more detail as to the nature of the asset, such as any service or mission to which the asset is critical or important. The asset value 346 indicates one or more values of the asset, such as a value in terms of (C, I, A) security dimension and/or a dollar value.

The asset profile 348 includes information used in mapping vulnerabilities to assets. Where an operating system vulnerability is identified in the data structure 330 (FIG. 11A) by its name and version, for example, the asset profile 348 of a PC may identify the name and version of the PC's operating system, and the vulnerability may thereby be mapped to the assets it exploits and affects by matching information in a vulnerability definition 334 with asset profiles. Access mechanisms which are available for accessing an asset may also be indicated in the asset profile 348 for use in mapping vulnerabilities requiring particular access mechanisms to assets.

It should also be appreciated that assets and vulnerabilities may be matched in the opposite direction, in that information associated with an asset may be used to identify vulnerabilities which affect that asset.

Vulnerabilities and assets which are to be included in a risk assessment may similarly be identified by a risk analyzer by accessing information in the data structures 330, 340. With reference to FIG. 3, suppose a user/owner selects through the configuration interface 64 a confidentiality (C) risk assessment. In this case, the risk analyzer 76 accesses the databases 82, 84 to identify vulnerabilities which affect confidentiality and possibly assets which are valuable for maintaining confidentiality in the network.

Information associated with relationships between an asset and other assets may also be included in the asset profile 348, in the form of a type of relationship and an asset identifier for each relationship.

Relationships may instead be indicated in separate data structures. Such a data structure might include an indication of a type of relationship and the endpoints or assets that share the relationship. Using such a data structure, assets that have relationships with a service and with other assets can be identified.

As noted above, the asset type field 344 may identify a service to which an asset is important. In another embodiment, services are separately specified in a data structure substantially similar to the data structure 340. In this case, service/asset relationships may be defined in the either or both of the service and asset data structures or in distinct relationship data structures.

Figure 11C:
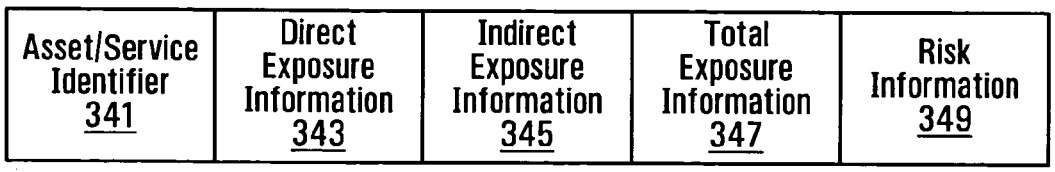

FIG. 11C is a block diagram of an illustrative example security state data structure 335. As shown, the security state data structure 335 includes an asset or service identifier 341, and security state information including direct exposure information 343, indirect exposure information 345, total exposure information 347, and risk information 349.

The identifier 341 identifies a service or some other asset of an information system, in terms of a user-defined name for instance. The fields 343, 345, 347, 349 store security state information, preferably including exposure and risk values calculated by the calculators 242, 244, 246, 248 (FIG. 10). Any or all of these values may be expressed as values of the above (C, I, A) security dimensions.

It should be appreciated that the fields 343, 345, 347, 349 may also store other exposure or risk information, such as an identifier of another asset, a relationship type, and a propagated vulnerability in the case of the indirect exposure information 345, for example.

Other variations of the data structure 335 include providing multiple exposure fields for direct and indirect exposures of an asset or feature. A separate field might be provided for each vulnerability which directly or indirectly affects an asset, for example. Tracking of contributing assets where security risk/exposure information includes aggregated values may also be supported by including one or more contributing asset identifier fields for each aggregated value.

The data structure 335 may be used for storage of data in the security state database 86 (FIG. 3), for example. In another embodiment, exposure and risk information is added to asset records in an asset database, in which case any or all of the exposure and risk fields 343, 345, 347, 349 may be included in the asset data structure 340, possibly as part of the asset profile 348.

The data structures 330, 340, 335 are illustrative examples of data structures which may be used to store vulnerability, asset, and security state information. Different data structures, including additional or different information, may be used in other embodiments.

Figure 12:
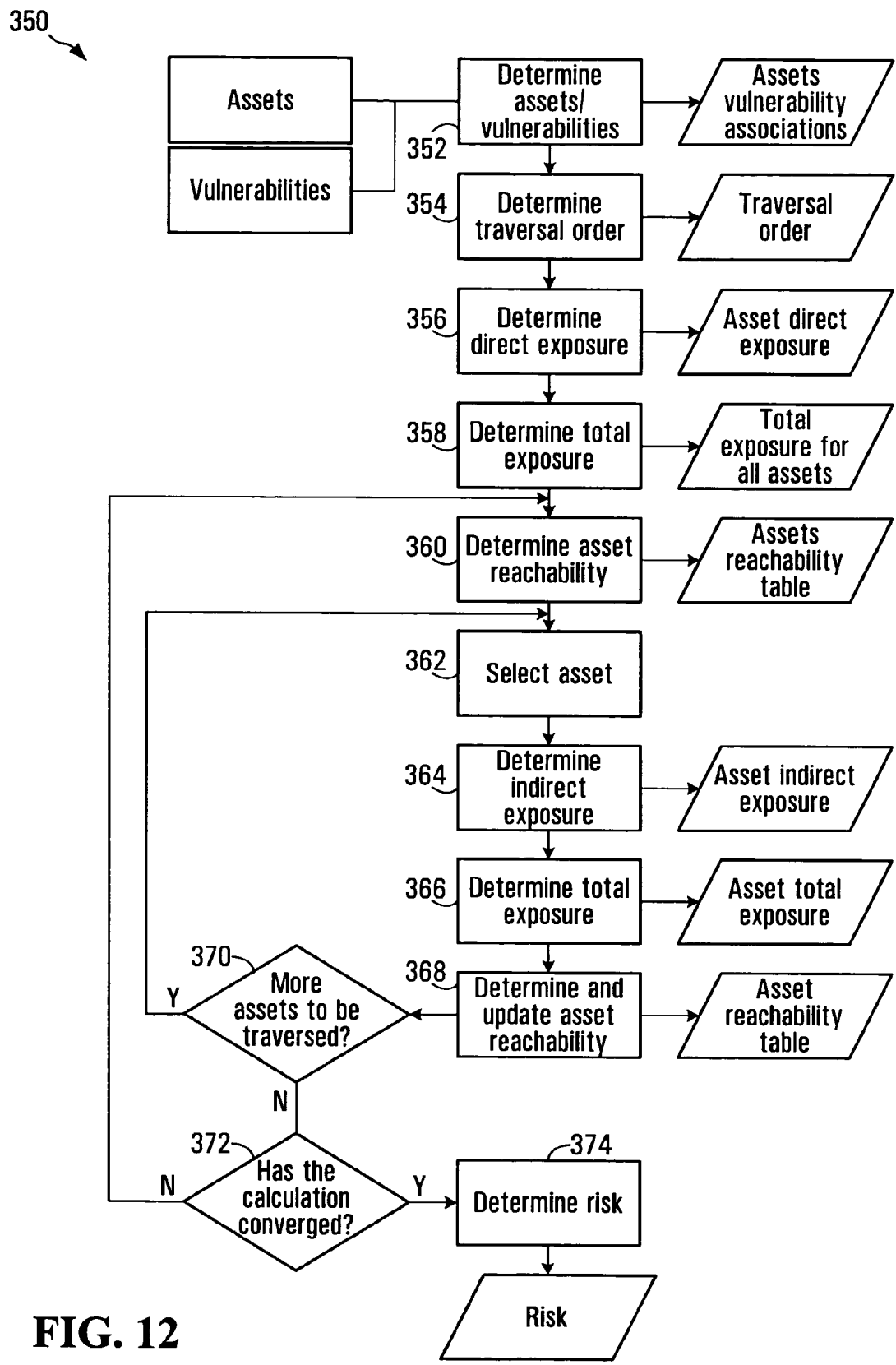
FIG. 12 is a flow diagram illustrating a risk calculation method.

FIG. 12 is a flow diagram illustrating a risk calculation method. In FIG. 12, operations in the method 350 are labelled with reference numbers, and outputs of the various operations are shown adjacent to the labelled operation blocks. The operation of the calculators shown in FIG. 10 according to embodiments of the invention will also become apparent from FIG. 12 and the description thereof.

The method 350 begins at 352 with an operation of determining assets and vulnerabilities, by an asset vulnerability builder as described above for instance, to generate assets/vulnerability associations. This determination may involve simply retrieving stored asset and vulnerability information, or in some embodiments processing information to calculate asset and vulnerability information, which is then compared to map or associate assets and vulnerabilities.

At 354, the traversal order for processing assets is determined. Direct exposures of the assets, in the traversal order, are then determined at 356 using the asset/vulnerability associations.

Direct exposure may be determined at 354 in (C, I, A) terms. In this case, each vulnerability has a (C, I, A) value which represents the effect that the vulnerability would have on an asset. A rule set is used in some embodiments to determine how final direct exposure values are calculated. For example, direct exposure for an asset could be generated using the sum of the (C, I, A) values of all of the vulnerabilities which directly affect, as indicated in the asset vulnerability associations determined at 352. Other possible direct exposure calculation rules may specify that a maximum value of the vulnerabilities or a maximum value of each security dimension is to be chosen as a final direct exposure value. The rule or rules used for direct exposure calculation may be predetermined or user-selected. The C, I, A terms are combined into an overall magnitude M in some embodiments.

It should be appreciated that further options are also possible for determining final direct exposures. For example, a direct exposure calculator may take additional information into account, such as a user-entered or otherwise provided indication of attacker expertise.

Total exposure is determined at 358, although in this case only direct exposure has been determined at 356 and thus total exposure is the same as the direct exposure.

The operations at 352 through 358 may initialize software-based calculators and data, specifically direct and total exposure for all assets, to be used in subsequent risk analysis. However, it should be appreciated that a user/owner may configure a risk analysis system such that only direct vulnerabilities are analyzed. In this case, direct exposure may be determined at 356 for all assets, or for only certain assets which are associated with a particular service, mission, and/or security dimension. The determination of total exposure at 358 may still be performed in this case, even though total exposure would be the same as direct exposure. This may be important, for example, in a software-based system in which a risk calculator is configured to determine a security risk based on a total exposure variable.

The method 350 then transitions into an indirect exposure phase, if risk analysis is to take indirect exposures into account, and continues at 360 with an operation of determining reachability for assets. In the case of a service security risk analysis, indirect exposure may be of primary importance.

As described above, assets may have relationships such as "depends-on" relationships between them. For example, a web server A might depend on a database server B. In this case, A's functionality relies on B functioning correctly and being reachable through the network. To determine reachability, other assets in the network, as well as "cabled-to" and "runs-on" relationships between A and B, are taken into account. For services, "composed-of" relationships are also considered.

The exposure of the path between these assets is determined, illustratively using some form of a Dijkstra algorithm, an Open Shortest Path First (OSPF) algorithm, an algorithm based on the "cut-set" techniques disclosed in U.S. patent application Ser. No. 11/232,004 referenced above, or some other algorithm accounting for relationships. Exposures for each of the assets in the path between two endpoint assets are also determined. The output of this algorithm is a reachability value, shown in FIG. 12 as a reachability table which contains that total exposure for each connected pair of assets.

An asset is selected at 362, in the traversal order determined at 354 or possibly in a different order, and its indirect exposure is determined at 364 based on its reachability and relationships.

Indirect exposure represents exposure of an asset to risks or vulnerabilities of other assets through its relationships. The determination of indirect exposure may involve traversing an entire list of relationships associated with the asset and evaluating whether each of those relationships have been fulfilled, that is, associated with one or more other assets.

When one asset depends on another, it also implies that the depended-on asset is reachable through the network. A risk to the reachability of each asset may thus be factored into the indirect exposure calculation.

A rule set may be used to determine the how indirect exposure values are calculated based on asset types and relationships. For example, an operating system asset might treat a "depends-on" relationship differently than a router asset would.

For each relationship evaluation, there may be several attributes to take into account, including the types of the assets at the endpoints of the relationship, the direct exposure values of those assets, a scaling factor associated with the relationship, and the exposure value for the path between those assets.

The reachability exposure of the endpoints of the relationship may be evaluated using the reachability table described above. This represents the exposure value for the path between the assets.

Using the parameters contained in the indirect exposure rule set, an evaluation of the exposure from each relationship is calculated. For example, the path exposure and the endpoint exposure could be combined and then multiplied by the relationship scaling factor to determine the indirect exposure for a single relationship. These operations are repeated for each relationship associated with the asset.

Once all relationship exposures have been determined, indirect exposure is determined based on the relationship exposures. For example, the relationship exposures could be summed, or a maximum or minimum relationship exposure or a maximum or minimum of each security dimension could be selected, to determine the final indirect exposure. Other algorithms, such as the cut-set techniques referenced above, may also or instead be used to determine indirect exposure.

Total exposure for the asset, including its direct exposure as determined at 354, and its indirect exposure as determined at 364, is determined at 366. As for the direct and indirect exposures described above, a rule set may be used to define how total exposure is determined. For example, a rule set might specify that 75% of total exposure is to come from direct exposure and 25% is to come from indirect exposure. Total exposure might also or instead be calculated as a maximum function where all dependent assets are required, a minimum function where any one of the dependent assets is required, or a combination of maximum and minimum functions based on the nature of the dependencies as described above. For example, supposing a service level asset is "composed-of" assets A, B, C, D, and E with dependencies based on the requirement that assets (A and B and C) and (D or E) be secure, then the total exposure may be calculated as:

Total Exposure=Max Exposure (Max Exposure ($A, B, C$), Min Exposure ($D, E$)).

The total exposure calculation might also or instead vary depending on the type of asset to which it is being applied, to provide different total exposure calculation schemes for an operating system and a hardware platform for instance.

As the total exposure of other assets with relationships to an asset may affect its reachability, the reachability of the asset may again be determined at 368 to update the asset reachability table. For example, a PC which connects to a network through a router may have a high exposure to the router's availability. Thus, the PC could be less reachable depending on the total exposure of the router.

As shown at 370, the operations at 362 through 368 are repeated for all assets to be analyzed. This may include all assets when a comprehensive network analysis is being performed, or only certain assets when a more targeted analysis, for particular assets or groups of assets or a particular service, mission, or security dimension for instance, is being conducted.

In some embodiments, steps 360-368 are iterated until either exposure calculations converge, as shown at 372, or some predetermined number of iterations have been completed.

An estimate of security risk is then determined at 374 using the total exposure and an indication of security risk is provided.

The steps of the method 350, in FIG. 12, are provided for illustrative purposes only and should not be considered to limit implementation of embodiments of the invention to these specific steps. For example, in some embodiments, steps 352-374 may be combined into fewer steps for optimization of the method.

Risk calculation, like exposure calculation, may be controlled by a rule set. A relatively simple risk calculator might implement a multiplication rule in which exposure and asset values are multiplied. Where (C, I, A) values are used, this type of scheme effectively accounts for differences in asset and exposure security parameters. For example, an exposure value of (1, 0, 0) generates a risk value of (1, 0, 0) only if the asset value also has a confidentiality parameter of 1. Thus, a confidentiality exposure results in a confidentiality risk only if an asset has value for the purposes of confidentiality. A confidentiality exposure would not result in any risk to an asset which has value only for integrity and/or availability.

A determination of risk may also involve processing further information, such as a user-entered threat value. In the case of a "multiply" risk calculation rule, a threat value might scale the product of exposure and asset values.

Figure 13:
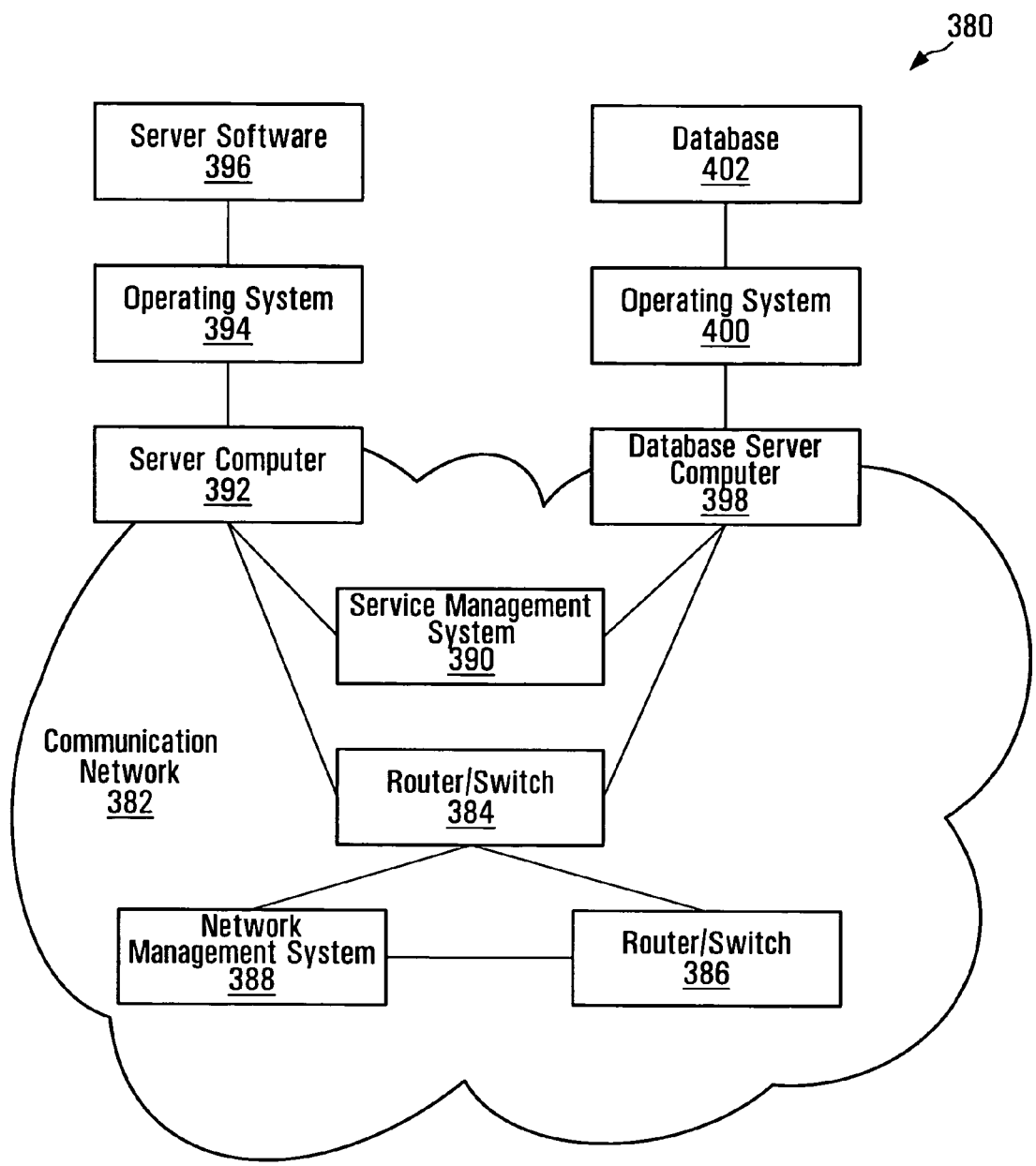
FIG. 13 is a block diagram of a communication system in conjunction with which embodiments of the invention may be implemented.

FIG. 13 is a block diagram of a system 380 in conjunction with which embodiments of the invention may be implemented. The communication network 382 in FIG. 13 includes routers/switches 384, 386 through which communication links may be established, a network management system 388 for managing the router/switch modules 384, 386, a server computer 392 and a database server computer 398 which communicate through the router/switch 384, and a service management system 390 which manages a service provided by the server computer 392 and the database server computer 398.

The server computer 392 and the database server computer 398 are examples of the PC and workstation shown in FIG. 5. These computers, along with their operating systems 394, 400 and server and database application software 396, 402, cooperate to provide a database access service such as an inventory service.

The types of equipment which might be implemented as the routers/switches 384, 386, the server computers 392, 398, and the management systems 388, 390, as well as other equipment which may be provided in the communication network 382, will be apparent to those skilled in the art. The present invention is in no way restricted to any specific types of equipment or other communication network assets. Although not explicitly shown in FIG. 13, other assets associated with the communication network 382, including buildings in which communication equipment or other assets are housed, may also be included in a communication network risk analysis model.

The security risk assessment techniques as disclosed herein would be useful in the network management system 388 for assessing risks to assets in the communication network 382. The service management system 390 is an example of another type of system in which embodiments of the invention may be useful, to manage risks to the server computers 392, 398 and other assets which are involved in providing a service.

A risk analyzer could be implemented as an extension to existing network and service management systems to provide current security status information of a network and/or service. Considering a telecommunications service provider for instance, embodiments of the present invention would complement an Operation Support System (OSS) and could be integrated in a Security Operation Center (SOC) next to a Network Operation Center (NOC). For OSS software vendors, the risk analysis and management techniques disclosed herein offer an opportunity to provide a specific security extension which could be offered as a customization added component.

Embodiments of the invention may provide many advantages relative to currently available information system and security management tools.

Risks due to security vulnerabilities are related to a service level view. Service level risk analysis for use in prioritization, for example, greatly improves the utility of a risk analysis tool.

Along with viewing risks by service, a "total impact" of each root cause can be presented. This allows optimum prioritization of remedial action. For example, if three nodes of a communication network are at risk or under attack, a number of services may be affected. Existing systems typically rate the importance against each asset or attempt to prioritize by assigning a static "value" to each asset. With the techniques disclosed herein, actual impacts to each asset and service can be dynamically calculated.

A consolidated view of a service can be displayed concurrently with other asset relationships. The consolidated views allow detailed information about a service to be displayed in a convenient way.

A mechanism to display multiple key attributes as well as an aggregated value, in a convenient and intuitive manner, is also provided. This is an improvement over existing systems that either provide limited information of the key attributes, or force the operator to access other reports through additional screens or functions.

Key security attributes and/or other risk information may also be aggregated into a single attribute or value in some embodiments, with both aggregated and contributing attributes or values being available to a user.

The invention provides a method to relate software versions, patches, and other asset information to a consolidated service view. Current software management systems may provide a view of software vulnerability and patch state, but without relating the view back to business objectives or the context of the information system. This results in poor prioritization related to business functions. A consolidated representation of a service as disclosed herein provides a clear relationship between a service, "composed-of" assets, and possibly other assets.

The various visual display features disclosed herein may also reduce the level of skill required of operators for normal operations.

Although described above primarily in the context of security risk, it is possible to use embodiments of the invention for many other purposes, such as capacity planning, QoS planning, etc. Embodiments of the invention may also be useful for checking information system capacity under error conditions. Conversely, under error conditions, the models disclosed herein might be used to determine which low priority services or functions could be shut down so as to preserve the integrity of higher priority functions.

What has been described is merely illustrative of the application of principles of the invention. Other arrangements and methods can be implemented by those skilled in the art without departing from the scope of the present invention.

For example, it should be appreciated that the service-level risk aggregation functions disclosed herein need not necessarily be applied to determine only service-level security risks. These functions may also be used to aggregate security risks for other types of asset groups, such as those shown in FIG. 6, in accordance with the relationships between assets.

Aggregation functions could also be applied where an asset is associated with multiple vulnerabilities. As noted in equations (1) and (2) above for instance, the risk to an asset might be determined based on a maximum of the vulnerabilities associated with that asset. A minimum function and other functions that determine an aggregated asset risk based on multiple vulnerabilities or the resultant security risks arising from those vulnerabilities are also contemplated. Thus, in some embodiments, aggregated asset security risks are determined using a maximum function, a minimum function, or some other aggregation function. References herein to aggregating risks that arise from multiple vulnerabilities are intended to include aggregating the vulnerabilities or the resultant asset risks, and should be interpreted accordingly. Records of contributing vulnerabilities are maintained for aggregated asset risks in some embodiments.

Although described primarily in the context of methods, systems, and data structures, other implementations of the invention are also contemplated, illustratively as instructions stored on a machine-readable medium, for example.

We claim:

1. An apparatus comprising:
a risk analyzer configured to identify one or more assets of an information system that have respective relationships with a service provided by the information system, and to determine one or more security risks to the service by analyzing effects of security vulnerabilities which are associated with the identified assets and are propagated to the service through the relationships; and
an interface operatively coupled to the risk analyzer and configured to provide a consolidated representation of the service, the consolidated representation comprising an indication of the one or more determined security risks and an indication of at least one of the respective relationships between the service and the one or more identified assets, the indication of the one or more determined security risks comprising, for each determined security risk, an indication of an overall security state associated with the security risk and respective indications of a plurality of security sub-states comprising the overall security state,
wherein at least one of the risk analyzer and the interface is implemented using hardware,
wherein the one or more identified assets comprise an asset that has a relationship with the service only through a relationship with an asset that has a relationship with the service,
wherein the indication of the one or more determined security risks comprises different representations of a security risk arising from a security vulnerability associated with an asset that has a relationship with the service and a security risk arising from a security vulnerability associated with an asset that has a relationship with the service only through a relationship with an asset that has a relationship with the service.

2. The apparatus of claim 1, wherein at least one of the risk analyzer and the interface is implemented in software for execution by a processing element.

3. The apparatus of claim 1, wherein the one or more identified assets further comprise one or more other services that have respective relationships with the service.

4. The apparatus of claim 1, wherein the risk analyzer is configured to determine the one or more security risks to the service by aggregating security risks to multiple contributing assets of the one or more identified assets.

5. The apparatus of claim 4, wherein the risk analyzer is configured to determine an aggregated security risk of the one or more security risks by performing one of:

selecting as the aggregated security risk a maximum of the security risks to the multiple contributing assets;
selecting as the aggregated security risk a minimum of the security risks to the multiple contributing assets; and
determining the aggregated security risk based on a combination of maximum and minimum security risks to the multiple contributing assets.

6. The apparatus of claim 1, wherein the risk analyzer is configured to determine an aggregated asset security risk to an asset of the one or more assets by aggregating security risks arising from multiple security vulnerabilities associated with the asset, and wherein aggregating comprises performing one of:
determining the aggregated asset security risk based on a maximum of the security risks arising from the multiple security vulnerabilities;
determining the aggregated asset security risk based on a minimum of the security risks arising from the multiple security vulnerabilities; and
determining the aggregated asset security risk based on a combination of maximum and minimum security risks arising from the multiple security vulnerabilities.

7. The apparatus of claim 1, wherein the consolidated representation of the service further comprises respective icons representing the service and at least one of the one or more identified assets, the indication of the at least one of the respective relationships between the service and the one or more identified assets comprising respective links between the respective icons representing the service and the at least one of the one or more identified assets.

8. The apparatus of claim 4, wherein the risk analyzer is further configured to maintain a record of at least one of the multiple contributing assets.

9. The apparatus of claim 1, wherein the respective relationships comprise an asset relationship between an asset, which has a relationship with the service, and another asset of the information system that has a relationship with the service only through the asset relationship.

10. The apparatus of claim 4, wherein the indication of the one or more security risks comprises a functional graphical element representing an aggregated security risk, the functional graphical element providing access to a record of at least one of the multiple contributing assets for the aggregated security risk.

11. The apparatus of claim 1, wherein the consolidated representation of the service comprises an icon for display in a Graphical User Interface (GUI), the icon comprising:
a representation of the service;
the indication of the overall security state; and
the respective indications of the plurality of sub-states.

12. The apparatus of claim 1, wherein the indication of the one or more determined security risks comprises:
a first set of indications of the overall security state and the plurality of security sub-states for a security risk to the service arising from one or more security vulnerabilities associated with the identified assets; and
a second set of indications of the overall security state and the plurality of security sub-states for a security risk arising from one or more security vulnerabilities associated with one or more other assets that have respective relationships with the service only through respective relationships with an asset of the identified assets.

13. A method comprising:
a risk analyzer identifying one or more assets of an information system that have respective relationships with a service provided by the information system;

the risk analyzer analyzing effects of security vulnerabilities, which are associated with the identified assets and are propagated to the service through the relationships, to determine one or more security risks to the service; and the risk analyzer providing through an interface, in a consolidated representation of the service, an indication of the one or more determined security risks and an indication of at least one of the respective relationships between the service and the one or more identified assets, the indication of the one or more determined security risks comprising, for each determined security risk, an indication of an overall security state associated with the security risk and respective indications of a plurality of security sub-states comprising the overall security state, wherein at least one of the risk analyzer and the interface is implemented using hardware, wherein identifying comprises identifying an asset that has a relationship with the service only through a relationship with an asset that has a relationship with the service, wherein the indication of the one or more determined security risks comprises different representations of a security risk arising from a security vulnerability associated with an asset that has a relationship with the service and a security risk arising from a security vulnerability associated with an asset that has a relationship with the service only through a relationship with an asset that has a relationship with the service.

14. The method of claim 13, wherein determining the one or more security risks comprises determining one or more aggregated security risks by aggregating security risks to multiple contributing assets of the identified assets, and maintaining a record of at least one of the contributing assets for each of the one or more aggregated security risks, and wherein aggregating security risks to multiple contributing assets to determine an aggregated security risk of the one or more security risks comprises performing one of:

selecting as the aggregated security risk a maximum of the security risks to the multiple contributing assets;

selecting as the aggregated security risk a minimum of the security risks to the multiple contributing assets; and determining the aggregated security risk based on a combination of maximum and minimum security risks to the multiple contributing assets.

15. The method of claim 13, wherein determining the one or more security risks comprises determining an aggregated asset security risk to an asset of the one or more assets by aggregating security risks arising from multiple security vulnerabilities associated with the asset, and wherein aggregating comprises performing one of:

determining the aggregated asset security risk based on a maximum of the security risks arising from the multiple security vulnerabilities;

determining the aggregated asset security risk based on a minimum of the security risks arising from the multiple security vulnerabilities; and determining the aggregated asset security risk based on a combination of maximum and minimum security risks arising from the multiple security vulnerabilities.

16. A non-transitory machine-readable medium storing instructions which when executed perform the method of claim 13.

* * * * *